United States Patent
Tanaka et al.

(10) Patent No.: US 11,837,982 B2
(45) Date of Patent: Dec. 5, 2023

(54) ROTARY MACHINE CONTROL DEVICE

(71) Applicant: Panasonic Intellectual Property Management Co., Ltd., Osaka (JP)

(72) Inventors: Yuya Tanaka, Kanagawa (JP); Tetsuya Matsuyama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/724,308

(22) Filed: Apr. 19, 2022

(65) Prior Publication Data

US 2022/0352837 A1  Nov. 3, 2022

(30) Foreign Application Priority Data

Apr. 28, 2021 (JP) ................................. 2021-076595
Sep. 29, 2021 (JP) ................................. 2021-159326

(51) Int. Cl.
  *H02P 23/14*  (2006.01)
  *H02P 25/022*  (2016.01)

(52) U.S. Cl.
  CPC ............ *H02P 23/14* (2013.01); *H02P 25/022* (2013.01)

(58) Field of Classification Search
  CPC ................................ H02P 23/14; H02P 25/022
  See application file for complete search history.

(56) References Cited

U.S. PATENT DOCUMENTS

| 2007/0024232 A1 | 2/2007 | Suzuki et al. |
| 2021/0194401 A1* | 6/2021 | Kojima .................. H02P 6/182 |
| 2022/0311311 A1* | 9/2022 | Harada ............... H02P 21/0021 |

FOREIGN PATENT DOCUMENTS

| JP | 3551912 B2 | 8/2004 |
| JP | 3708511 B2 | 10/2005 |
| JP | 4625116 B2 | 2/2011 |
| JP | 4729356 B2 | 7/2011 |
| JP | 5250603 B2 | 7/2013 |
| JP | 2015126598 | * 7/2015 |
| JP | 2015126598 A | 7/2015 |
| JP | 2016100994 | * 5/2016 |

(Continued)

OTHER PUBLICATIONS

Translation of JP2016100994 has been attached.*

(Continued)

*Primary Examiner* — Zoheb S Imtiaz
(74) *Attorney, Agent, or Firm* — Seed IP Law Group LLP

(57) ABSTRACT

A rotary machine control device includes: a flux estimator that estimates a rotary machine flux; a command amplitude specifier that generates a command amplitude that is an amplitude of a command flux, by executing feedback control using a product of an estimated flux or an estimated magnet flux and a detected current; a command flux specifier that generates the command flux using the command amplitude; and a switcher that controls switching from a current synchronous operation to a flux control operation. When the switcher controls switching to the flux control operation, the flux estimator gives, to the feedback control, an amplitude of the estimated flux estimated before switching to the flux control operation, as an initial value of the command amplitude immediately after switching to the flux control operation.

18 Claims, 17 Drawing Sheets

(56) References Cited

FOREIGN PATENT DOCUMENTS

| JP | 6206767 B2 | 10/2017 |
|----|------------|---------|
| JP | 6414771 B2 | 10/2018 |
| JP | 6473992 B2 | 2/2019  |

OTHER PUBLICATIONS

Translation of JP2015126598 has been attached.*
Inoue et al., "Improvement of Torque Response and Examination of Sensorless Drive System Based on Direct Torque Control for IPMSM," *The transactions of the Institute of Electrical Engineers of Japan. C* 128(1):78-86, 2008. (21 pages with partial English translation).
Inoue et al., "Mathematical Model and Control Method of Maximum Torque per Ampere for PMSM in Stator Flux Linkage Synchronous Frame," *The transactions of the Institute of Electrical Engineers of Japan. D* 135(6):689-696, 2015. (11 pages with partial English translation).
Inoue et al., "Torque ripple reduction, and flux-weakening control for interior permanent magnet synchronous motor based on direct torque control," The 2006 Annual Meeting of the Institute of Electrical Engineers of Japan, 4-106, Mar. 15-17, 2006, pp. 166-167. (4 pages with partial English translation).
Office Action, dated Nov. 29, 2022, for Japanese Patent Application No. 2021-159326. (10 pages) (with English translation).
Office Action, dated May 9, 2023, for Japanese Patent Application No. 2021-159326. (5 pages) (with English Translation).

* cited by examiner

ROTARY MACHINE CONTROL DEVICE

CROSS REFERENCE TO RELATED APPLICATIONS

The present application is based on and claims priority of Japanese Patent Application No. 2021-076595 filed on Apr. 28, 2021 and priority of Japanese Patent Application No. 2021-159326 filed on Sep. 29, 2021.

FIELD

The present disclosure relates to a rotary machine control device that controls a rotary machine.

BACKGROUND

Up to now, a position sensorless flux control operation using direct torque control (DTC) has been known as a method of driving a synchronous rotary machine (synchronous motor).

For example, Non Patent Literature (NPL) 1 and NPL 2 describe examples of the direct torque control, and Patent Literature (PTL) 1 describes an example of a rotary machine control device using a flux.

Moreover, for example, PTL 2 gives a description for stability improvement in an activation period (a period including an activation time point) of a rotary machine control device using the direct torque control.

CITATION LIST

Patent Literature

PTL 1: Japanese Patent No. 6473992
PTL 2: Japanese Patent No. 6414771

Non Patent Literature

NPL 1: Yukinori Inoue, Shigeo Morimoto, Masayuki Sanada, "Improvement of torque response and examination of sensorless drive system based on direct torque control for IPMSM," The transactions of the Institute of Electrical Engineers of Japan. C, vol. 128(1), pp. 78-86 (2008)
NPL 2: Tatsuki Inoue, Yukinori Inoue, Shigeo Morimoto, Masayuki Sanada, "Mathematical Model and Control Method of Maximum Torque Per Ampere for PMSM in Stator Flux Linkage Synchronous Frame," The transactions of the Institute of Electrical Engineers of Japan. D, vol. 135(6), pp. 689-696 (2015)

SUMMARY

However, the techniques according to PTLs 1 and 2 and NPLs 1 and 2 can be improved upon.

In view of this, the present disclosure provides a rotary machine control device capable of improving upon the above related art.

A rotary machine control device according to an aspect of the present disclosure is a rotary machine control device including: a flux estimator that estimates a rotary machine flux that is a flux of a synchronous rotary machine; a command amplitude specifier that generates a command amplitude that is an amplitude of a command flux, by executing feedback control using a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current; a command flux specifier that generates the command flux using the command amplitude; and a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current necessary for activating the synchronous rotary machine, the flux control operation being an operation of performing control to cause the estimated flux to be the command flux generated by the command flux specifier, wherein, when the switcher controls switching to the flux control operation, the flux estimator gives, to the feedback control, an amplitude of the estimated flux estimated before switching to the flux control operation, as an initial value of the command amplitude immediately after switching to the flux control operation.

A rotary machine control device according to an aspect of the present disclosure is a rotary machine control device including: a flux estimator that estimates a rotary machine flux that is a flux of a synchronous rotary machine; an error variable specifier that calculates a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current; and a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current necessary for activating the synchronous rotary machine, the flux control operation being an operation of performing control to cause the estimated flux to be a command flux, wherein the switcher switches from the current synchronous operation to the flux control operation when an absolute value of the first inner product or the second inner product calculated by the error variable specifier becomes less than or equal to a predetermined value during the current synchronous operation or when a first predetermined period has elapsed from a start of the current synchronous operation, the first predetermined period being determined based on an acceleration rate and a switching rotation speed of the synchronous rotary machine that are determined in advance.

A rotary machine control device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
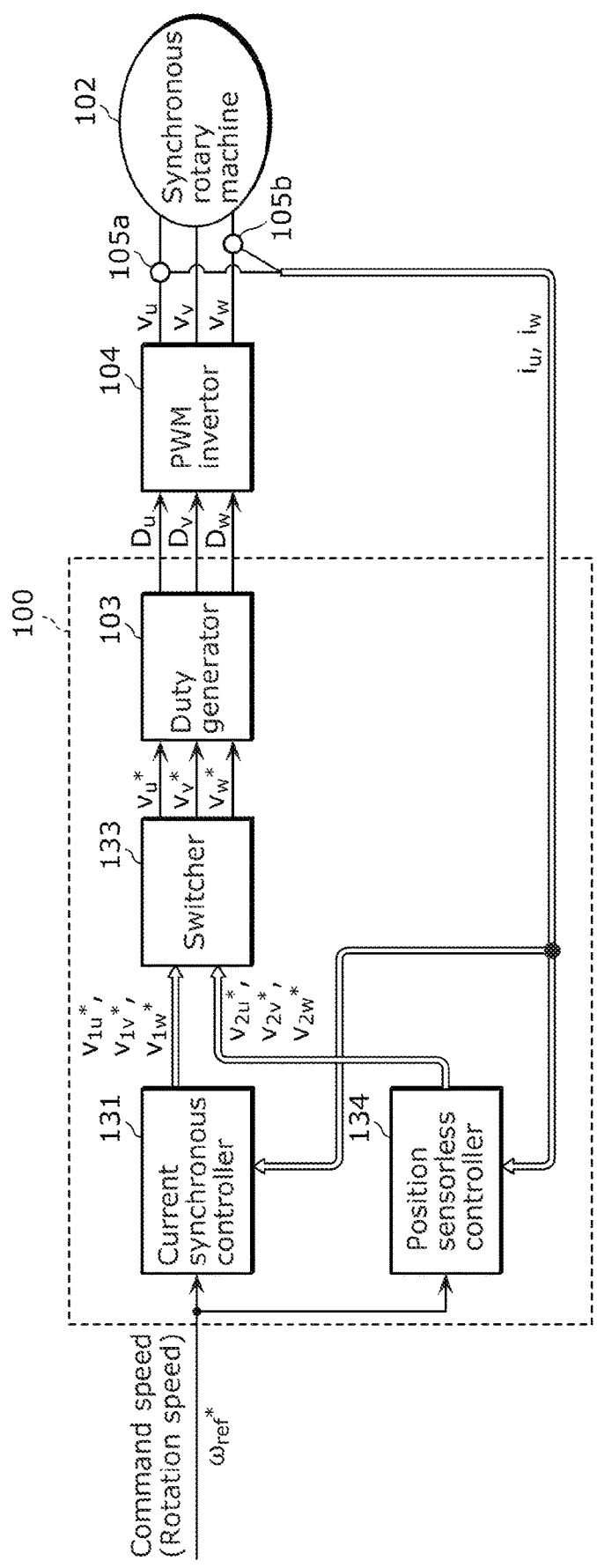
FIG. 1 is a block diagram of a rotary machine control device according to Embodiment 1.

Background of how Aspect of Present Disclosure was Obtained

A flux control operation which mainly uses a flux, such as the direct torque control described in NPL 1, can be used for controlling a high-speed rotation range of a synchronous rotary machine. In this control, a flux applied to the synchronous rotary machine is estimated, and a higher voltage is applied to the synchronous rotary machine as a difference (vector difference) between a command flux and the obtained estimated flux is larger.

Moreover, a current synchronous operation using current control has been known as a method of stably starting up the synchronous rotary machine.

PTL 1 proposes, as the control in which these operations are combined, a method of suppressing a voltage surge that occurs at the time of switching from the current synchronous operation (at start-up) to the flux control operation (at high-speed rotation).

Meanwhile, it is desired to further suppress the above-described voltage surge.

In view of this, the present inventors made earnest experiments and studies for the purpose of further suppressing the above-described voltage surge. As a result, the present inventors obtained the finding of: configuring feedback control in which the amplitude of the command flux was made coincident with the amplitude of a target flux; and performing feedback control in which the estimated flux that was obtained during the current synchronous operation before the switching was set as an initial value of the command flux, at the time of switching from the current synchronous operation to the flux control operation, to thereby enable further suppressing the above-described voltage surge.

Moreover, the present inventors obtained the finding of: specifying an amount of movement that a phase of the estimated flux should move per control cycle, using a command speed; specifying a phase of the command flux using the specified amount of movement and the phase of the estimated flux; and inserting, based on the specified phase of the command flux, a flux synchronous operation that is carried out as the flux control operation, to thereby enable further suppressing the above-described voltage surge.

Moreover, the present inventors obtained the finding of: calculating reactive power components by obtaining a first inner product that was a product of the estimated flux and a detected current of the synchronous rotary machine or a second inner product that was a product of a magnet flux and the detected current of the synchronous rotary machine; and switching from the current synchronous operation to the flux control operation at the timing at which an absolute value of the calculated reactive power components became less than or equal to a predetermined value, to thereby enable suppressing an actual torque at the time of the switching from falling below a load torque and thus enable suppressing a loss of synchronism in the flux control operation after the switching.

Moreover, the present inventors obtained the finding of switching from the current synchronous operation to the flux control operation at the timing at which an induced voltage of the synchronous rotary machine became high enough, to thereby enable carrying out the flux control operation after the switching with high accuracy and thus enable suppressing a loss of synchronism in the flux control operation after the switching.

The present inventors further made earnest experiments and studies based on these findings to conceive the following rotary machine control device.

A rotary machine control device according to an aspect of the present disclosure is a rotary machine control device including: a flux estimator that estimates a rotary machine flux that is a flux of a synchronous rotary machine; a command amplitude specifier that generates a command amplitude that is an amplitude of a command flux, by executing feedback control using a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current; a command flux specifier that generates the command flux using the command amplitude; and a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current necessary for activating the synchronous rotary machine, the flux control operation being an operation of performing control to cause the estimated flux to be the command flux generated by the command flux specifier, wherein, when the switcher controls switching to the flux control operation, the flux estimator gives, to the feedback control, an amplitude of the estimated flux estimated before switching to the flux control operation, as an initial value of the command amplitude immediately after switching to the flux control operation.

According to the rotary machine control device having the above-described configuration, at the time of the switching from the current synchronous operation to the flux control operation, the amplitude of the estimated flux before the switching to the flux control operation can be made coincident with the command amplitude that is the amplitude of the command flux after the switching.

Therefore, according to the rotary machine control device having the above-described configuration, the voltage surge that occurs at the time of the switching from the current synchronous operation to the flux control operation can be suppressed.

Accordingly, according to the rotary machine control device having the above-described configuration, the stability in the activation period of the rotary machine control device that performs a flux control operation which mainly uses the flux, such as the direct torque control, can be further improved.

Moreover, the rotary machine control device may further include: a torque estimator that calculates an estimated torque using the detected current and the estimated flux; and a command phase specifier that calculates a torque phase for converging the estimated torque with a command torque. The command flux specifier may generate the command flux using the command amplitude and the torque phase that is calculated by the command phase specifier from the phase of the estimated flux, and the rotary machine control device may carry out, as the flux control operation, a position sensorless flux control operation that is performed based on the command flux.

Accordingly, the position sensorless flux control operation can be carried out as the flux control operation.

Moreover, the command flux specifier may (1) specify an amount of movement that the phase of the estimated flux should move per control cycle, using a command speed given to the synchronous rotary machine, and (2) specify a command flux vector phase, using the amount of movement specified and the phase of the estimated flux, and the rotary machine control device may carry out a flux synchronous operation based on the command flux vector phase as the flux control operation.

Accordingly, at the time of the switching from the current synchronous operation to the flux control operation, the phase of the estimated flux before the switching to the flux control operation can be made coincident with the phase of the command flux after the switching.

Therefore, according to the rotary machine control device having the above-described configuration, the voltage surge that occurs at the time of the switching from the current synchronous operation to the flux control operation can be further suppressed.

Accordingly, according to the rotary machine control device having the above-described configuration, the stability in the activation period of the rotary machine control device that performs a flux control operation which mainly uses the flux, such as the direct torque control, can be further improved.

Moreover, when the rotary machine control device transitions from the current synchronous operation to the position sensorless flux control operation: the command flux specifier may (1) specify an amount of movement that the phase of the estimated flux should move per control cycle, using a command speed given to the synchronous rotary machine, and (2) specify a command flux vector phase, using the amount of movement specified and the phase of the estimated flux; and the rotary machine control device may insert, based on the command flux vector phase, a flux synchronous operation that is carried out as the flux control operation.

As a result, at the time of the switching from the current synchronous operation to the position sensorless flux control operation, fluctuations in the amplitude of the command flux and fluctuations in the phase thereof are suppressed from occurring at the same time.

Therefore, according to the rotary machine control device having the above-described configuration, the voltage surge that occurs at the time of the switching from the current synchronous operation to the position sensorless flux control operation can be further suppressed.

Accordingly, according to the rotary machine control device having the above-described configuration, the stability in the activation period of the rotary machine control device that performs a flux control operation which mainly uses the flux, such as the direct torque control, can be further improved.

Moreover, the command amplitude specifier may set a value greater than or equal to zero as a target value for a calculation result of the first inner product or the second inner product.

Accordingly, a current that generates a field flux in a magnet flux direction of the permanent magnet of the synchronous rotary machine can be caused to flow. Therefore, an effect equivalent to an effect of increasing the magnetic force of the permanent magnet can be obtained.

Moreover, the rotary machine control device may further include an error variable specifier that calculates the first inner product or the second inner product, and the switcher may switch from the current synchronous operation to the flux control operation when an absolute value of the first inner product or the second inner product calculated by the error variable specifier becomes less than or equal to a predetermined value during the current synchronous operation or when a first predetermined period has elapsed from a start of the current synchronous operation, the first predetermined period being determined based on an acceleration rate and a switching rotation speed of the synchronous rotary machine that are determined in advance.

According to the rotary machine control device having the above-described configuration, the switching from the current synchronous operation to the flux control operation can be made at the timing at which the absolute value of the reactive power components that can be obtained from the first inner product or the second inner product becomes less than or equal to the predetermined value. Therefore, according to the rotary machine control device having the above-described configuration, the actual torque at the time of the switching is suppressed from falling below the load torque. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Alternatively, according to the rotary machine control device having the above-described configuration, the switching from the current synchronous operation to the flux control operation can be made at the timing at which the induced voltage of the synchronous rotary machine has risen to a voltage at which the flux control operation after the switching can be carried out with high accuracy, due to the lapse of the first predetermined period from the start of the current synchronous operation. Therefore, according to the rotary machine control device having the above-described configuration, the flux control operation after the switching can be carried out with high accuracy. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Moreover, the predetermined value may be zero.

The actual torque becomes the largest at the timing at which the absolute value of the reactive power components becomes zero.

Therefore, the stability in an activation period of the rotary machine control device that performs a flux control operation which mainly uses a flux, such as the direct torque control, can be further effectively improved.

Moreover, the switcher may prohibit the switching from the current synchronous operation to the flux control operation when the absolute value of the first inner product or the second inner product obtained by the error variable specifier becomes less than or equal to the predetermined value in a second predetermined period from the start of the current synchronous operation, the second predetermined period being shorter than the first predetermined period.

Even when the absolute value of the reactive power components becomes less than or equal to the predetermined value, if the induced voltage of the synchronous rotary machine does not sufficiently rise, the flux control operation after the switching cannot be carried out with high accuracy in some cases.

According to the rotary machine control device having the above-described configuration, even when the absolute value of the reactive power components becomes less than or equal to the predetermined value, if the induced voltage of the synchronous rotary machine does not sufficiently rise, the switching from the current synchronous operation to the flux control operation can be prohibited. Therefore, according to the rotary machine control device having the above-described configuration, the phenomenon that the flux control operation after the switching cannot be carried out with high accuracy, which results from this insufficient rise in the induced voltage of the synchronous rotary machine, can be suppressed from occurring, and hence the flux control operation after the switching can be carried out with high accuracy. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Moreover, the switcher may switch from the current synchronous operation to the flux control operation when the absolute value of the first inner product or the second inner product calculated by the error variable specifier does not become less than or equal to the predetermined value during the current synchronous operation and the first predetermined period has elapsed.

According to the rotary machine control device having the above-described configuration, the switching from the current synchronous operation to the flux control operation can be made at the timing at which the induced voltage of the synchronous rotary machine has risen to a voltage at which the flux control operation after the switching can be carried out with high accuracy, due to the lapse of the first predetermined period from the start of the current synchronous operation. Therefore, according to the rotary machine control device having the above-described configuration, the flux control operation after the switching can be carried out with high accuracy. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

A rotary machine control device according to an aspect of the present disclosure is a rotary machine control device including: a flux estimator that estimates a rotary machine flux that is a flux of a synchronous rotary machine; an error variable specifier that calculates a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current; and a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current necessary for activating the synchronous rotary machine, the flux control operation being an operation of performing control to cause the estimated flux to be a command flux, wherein the switcher switches from the current synchronous operation to the flux control operation when an absolute value of the first inner product or the second inner product calculated by the error variable specifier becomes less than or equal to a predetermined value during the current synchronous operation or when a first predetermined period has elapsed from a start of the current synchronous operation, the first predetermined period being determined based on an acceleration rate and a switching rotation speed of the synchronous rotary machine that are determined in advance.

According to the rotary machine control device having the above-described configuration, the switching from the current synchronous operation to the flux control operation can be made at the timing at which the absolute value of the reactive power components that can be obtained from the first inner product or the second inner product becomes less than or equal to the predetermined value. Therefore, according to the rotary machine control device having the above-described configuration, the actual torque at the time of the switching is suppressed from falling below the load torque. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Alternatively, according to the rotary machine control device having the above-described configuration, the switching from the current synchronous operation to the flux control operation can be made at the timing at which the induced voltage of the synchronous rotary machine has risen to a voltage at which the flux control operation after the switching can be carried out with high accuracy, due to the lapse of the first predetermined period from the start of the current synchronous operation. Therefore, according to the rotary machine control device having the above-described configuration, the flux control operation after the switching can be carried out with high accuracy. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Moreover, the predetermined value may be zero.

The actual torque becomes the largest at the timing at which the absolute value of the reactive power components becomes zero.

Therefore, the stability in an activation period of the rotary machine control device that performs a flux control operation which mainly uses a flux, such as the direct torque control, can be further effectively improved.

Moreover, the switcher may prohibit the switching from the current synchronous operation to the flux control operation when the absolute value of the first inner product or the second inner product obtained by the error variable specifier becomes less than or equal to the predetermined value in a second predetermined period from the start of the current synchronous operation, the second predetermined period being shorter than the first predetermined period.

Even when the absolute value of the reactive power components becomes less than or equal to the predetermined value, if the induced voltage of the synchronous rotary machine does not sufficiently rise, the flux control operation after the switching cannot be carried out with high accuracy in some cases.

According to the rotary machine control device having the above-described configuration, even when the absolute value of the reactive power components becomes less than or equal to the predetermined value, if the induced voltage of the synchronous rotary machine does not sufficiently rise, the switching from the current synchronous operation to the flux control operation can be prohibited. Therefore, according to the rotary machine control device having the above-described configuration, the phenomenon that the flux control operation after the switching cannot be carried out with high accuracy, which results from this insufficient rise in the induced voltage of the synchronous rotary machine, can be suppressed from occurring, and hence the flux control operation after the switching can be carried out with high accuracy. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Moreover, the switcher may switch from the current synchronous operation to the flux control operation when the absolute value of the first inner product or the second inner product calculated by the error variable specifier does not become less than or equal to the predetermined value during the current synchronous operation and the first predetermined period has elapsed.

According to the rotary machine control device having the above-described configuration, the switching from the current synchronous operation to the flux control operation can be made at the timing at which the induced voltage of the synchronous rotary machine has risen to a voltage at which the flux control operation after the switching can be carried out with high accuracy, due to the lapse of the first predetermined period from the start of the current synchronous operation. Therefore, according to the rotary machine control device having the above-described configuration, the flux control operation after the switching can be carried out with high accuracy. As a result, the loss of synchronism in the flux control operation after the switching can be suppressed.

Accordingly, according to the rotary machine control device having the above-described configuration, the stability in the activation period of the rotary machine control device that performs a flux control operation which mainly uses the flux, such as the direct torque control, can be further improved.

Hereinafter, specific examples of a rotary machine control device according to an aspect of the present disclosure will be described with reference to the accompanying drawings. The embodiments described herein each illustrate a specific example of the present disclosure. Therefore, the numerical values, shapes, materials, constituent elements, the arrangement and connection of the constituent elements, steps (processes), the processing order of the steps, etc. illustrated in the embodiments below are mere examples, and do not intend to limit the present disclosure. Moreover, the drawings are represented schematically and are not necessarily precise illustrations.

Note that general or specific aspects of the present disclosure may be implemented using a system, a method, an integrated circuit, a computer program, a computer-readable recording medium such as a compact disc read-only memory (CD-ROM), or any combination of systems, methods, integrated circuits, computer programs, and recording media.

Embodiment 1

As illustrated in FIG. 1, rotary machine control device 100 includes first current sensor 105a, second current sensor 105b, current synchronous controller 131, position sensorless controller 134, switcher 133, and duty generator 103. Rotary machine control device 100 is connected to pulse width modulation (PWM) invertor 104 and synchronous rotary machine 102.

Current synchronous controller 131 is configured to execute a current synchronous operation of synchronous rotary machine 102. Position sensorless controller 134 is configured to execute a position sensorless flux control operation of synchronous rotary machine 102. The current synchronous operation is an operation for reliably making a rotation rate (rotation speed) of a rotor of synchronous rotary machine 102 coincident with a rotation rate (synchronous speed) for a rotary machine current applied to synchronous rotary machine 102. In Embodiment 1, even in a period in which the position sensorless flux control operation is executed, the rotation rate of the rotor of synchronous rotary machine 102 is made coincident with the synchronous speed. The position sensorless flux control operation is an operation not using position sensors such as an encoder and a resolver. Note that, in Embodiment 1, the position sensors are not used even in a period in which the current synchronous operation is executed. Herein, for convenience of description, an operation of controlling the rotary machine current without using a phase of an estimated rotary machine flux is referred to as the current synchronous operation. An operation of controlling a rotary machine flux using the phase of the estimated rotary machine flux is referred to as the flux control operation. The rotary machine flux is a concept including both of: an armature interlinkage flux on three-phase AC coordinates applied to synchronous rotary machine 102; and a flux obtained by performing coordinate conversion on the armature interlinkage flux. Herein, the "amplitude" simply means magnitude (absolute value) in some cases.

Some or all of elements of rotary machine control device 100 can be provided by control applications executed in a digital signal processor (DSP) or a microcomputer. The DSP or the microcomputer may include peripheral devices such as a core, a memory, an A/D conversion circuit, and a communication port. Moreover, some or all of the elements of rotary machine control device 100 may be configured by a logic circuit.

(Outline of Control by Rotary Machine Control Device 100)

Rotary machine control device 100 generates duties $D_u$, $D_v$, and $D_w$ from command speed $\omega_{ref}*$ and phase currents $i_u$ and $i_w$. From duties $D_u$, $D_v$, and $D_w$, voltage vectors $v_u$, $v_v$, and $v_w$ to be applied to synchronous rotary machine 102 are generated by PWM inverter 104. Command speed $\omega_{ref}*$ is given from a higher-level control device to rotary machine control device 100. Command speed $\omega_{ref}*$ represents a speed to be followed by synchronous rotary machine 102.

With reference to FIG. 1, the outline of an operation of rotary machine control device 100 is described. Phase currents $i_u$ and $i_w$ are detected by current sensors 105a and 105b (first current sensor 105a and second current sensor 105b). When the current synchronous operation is executed, command voltage vectors $v_{1u}*$, $v_{1v}*$, and $v_{1w}*$ are generated from command speed $\omega_{ref}*$ and phase currents $i_u$ and $i_w$ by current synchronous controller 131. Components of command voltage vectors $v_{1u}*$, $v_{1v}*$, and $v_{1w}*$ respectively correspond to a U-phase voltage, a V-phase voltage, and a W-phase voltage on three-phase AC coordinates. When the position sensorless flux control operation is executed, command voltage vectors $v_{2u}*$, $v_{2v}*$, and $v_{2w}*$ are generated from command speed $\omega_{ref}*$ and phase currents $i_u$ and $i_w$ by position sensorless controller 134. Components of command voltage vectors $v_{2u}*$, $v_{2u}*$, and $v_{2w}*$ respectively correspond to the U-phase voltage, the V-phase voltage, and the W-phase voltage on the three-phase AC coordinates. When the current synchronous operation is executed, command voltage vectors $v_{1u}*$, $v_{1v}*$, and $v_{1w}*$ are selected and output as command voltage vectors $v_u*$, $v_v*$, and $v_w*$ by switcher 133. When the position sensorless flux control operation is executed, command voltage vectors $v_{2u}*$, $v_{2v}*$, and $v_{2w}*$ are selected and output as command voltage vectors $v_u*$, $v_v*$, and $v_w*$ by switcher 133. Duties $D_u$, $D_v$, and $D_w$ are generated from command voltage vectors $v_u*$, $v_v*$, and $v_w*$ by duty generator 103. Duties $D_u$, $D_v$, and $D_w$ are input to PWM inverter 104. Through such control, the speed of synchronous rotary machine 102 is controlled so as to follow command speed $\omega_{ref}*$.

Figure 2:
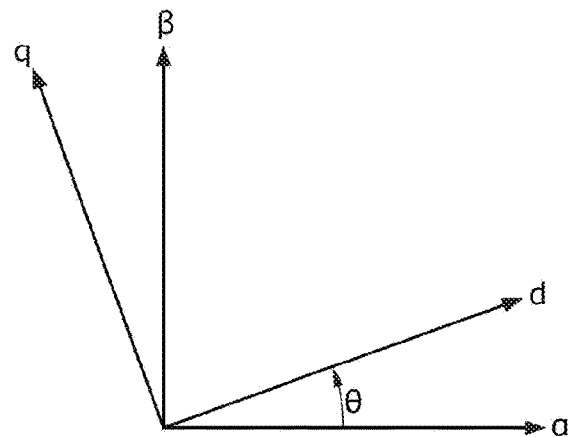
FIG. 2 is a diagram for describing a d-q coordinate system and an α-β coordinate system.

Rotary machine control device 100 may be described below based on d-q coordinates (first two-phase coordinates). Moreover, rotary machine control device 100 may also be described based on α-β coordinates (second two-phase coordinates). FIG. 2 illustrates the d-q coordinates and the α-β coordinates. The α-β coordinates are fixed coordinates. The α-β Coordinates are referred to both as coordinates at rest and as AC coordinates. The α-axis is set as an axis extending in the same direction as that of the U axis (omitted in FIG. 2). The d-q coordinates are rotational coordinates. θ is a lead angle of the d-axis with respect to the U axis. θ is also referred to as a rotor position.

(Outline of Control by Current Synchronous Controller 131)

Current synchronous controller 131 executes the current synchronous operation of supplying, regardless of a phase of the rotary machine flux, synchronous rotary machine 102 with a current for the current synchronous operation. Here, the current for the current synchronous operation supplied to synchronous rotary machine 102 is a current necessary for activating synchronous rotary machine 102.

Figure 3:
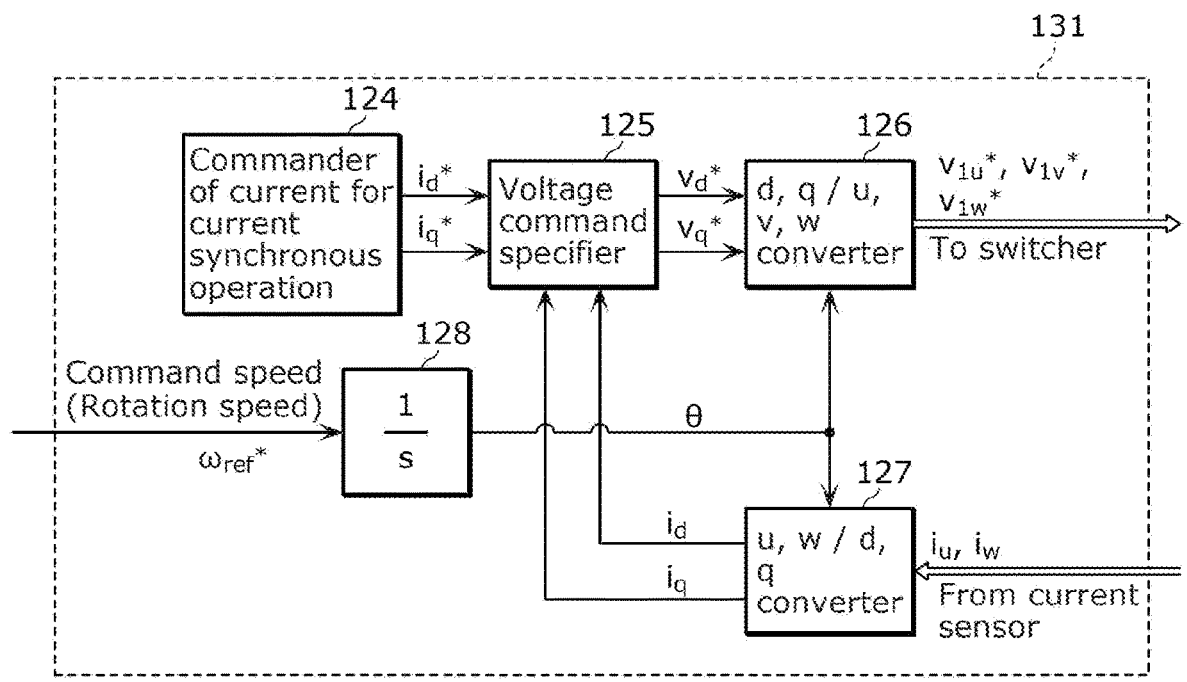
FIG. 3 is a block diagram of a current synchronous controller according to Embodiment 1.

As illustrated in FIG. 3, current synchronous controller 131 includes commander of current for current synchronous operation 124, voltage command specifier (first voltage command specifier) 125, d, q/u, v, w converter (first two-phase/three-phase coordinate converter) 126, u, w/d, q converter (first two-phase/two-phase coordinate converter) 127, and integrator 128.

In current synchronous controller 131, rotor position θ is specified from command speed $\omega_{ref}*$ by integrator 128. Rotor position θ represents a position of the rotor of synchronous rotary machine 102. Rotor position θ corresponds to a phase of a permanent magnet of the rotor. Phase currents $i_u$ and $i_w$ are converted into axis currents $i_d$ and $i_q$ (first axis currents) by u, w/d, q converter 127. In this conversion, rotor position θ is used. Axis currents $i_d$ and $i_q$ are given as a collective expression of d-axis current $i_d$ and q-axis current $i_q$ on the d-q coordinates of synchronous rotary machine 102. Command axis currents $i_d*$ and $i_q*$ are generated by commander of current for current synchronous operation 124. Command axis currents $i_d*$ and $i_q*$ are axis currents to be followed by axis currents $i_d$ and $i_q$. Command axis currents $i_d*$ and $i_q*$ are given as a collective expression of d-axis command axis current $i_d*$ and q-axis command axis current $i_q*$ on the d-q coordinates of synchronous rotary machine 102. Command axis voltages $v_d^*$ and $v_q^*$ (first axis voltages) are generated from command axis currents $i_d^*$ and $i_q^*$ and axis currents $i_d$ and $i_q$ by voltage command specifier 125. Command axis voltages $v_d^*$ and $v_q^*$ are given as a collective expression of d-axis command axis voltage $v_d^*$ and q-axis command axis voltage $v_q^*$ on the d-q coordinates of synchronous rotary machine 102. Command axis voltages $v_d^*$ and $v_q^*$ are converted into command voltage vectors $v_{1u}^*$, $v_{1v}^*$, and $v_{1w}^*$ by d, q/u, v, w converter 126. In this conversion, rotor position θ is used. In the current synchronous operation, through such control, the speed follows command speed $\omega_{ref}^*$, and axis currents $i_d$ and $i_q$ follow command axis currents $i_d^*$ and $i_q^*$.

(Outline of Control by Position Sensorless Controller 134)

Position sensorless controller 134 executes the position sensorless flux control operation of setting a command amplitude such that an amplitude of the rotary machine flux converges with a target amplitude. The position sensorless flux control operation is executed with reference to command phase $\theta_s^*$ that is obtained from a phase (estimated phase $\theta_s$) of the rotary machine flux estimated by flux estimator 108 (to be described later). The target amplitude is an amplitude to be finally reached by the amplitude of the rotary machine flux. The command amplitude is an amplitude to be followed by the amplitude of the rotary machine flux.

Figure 4:
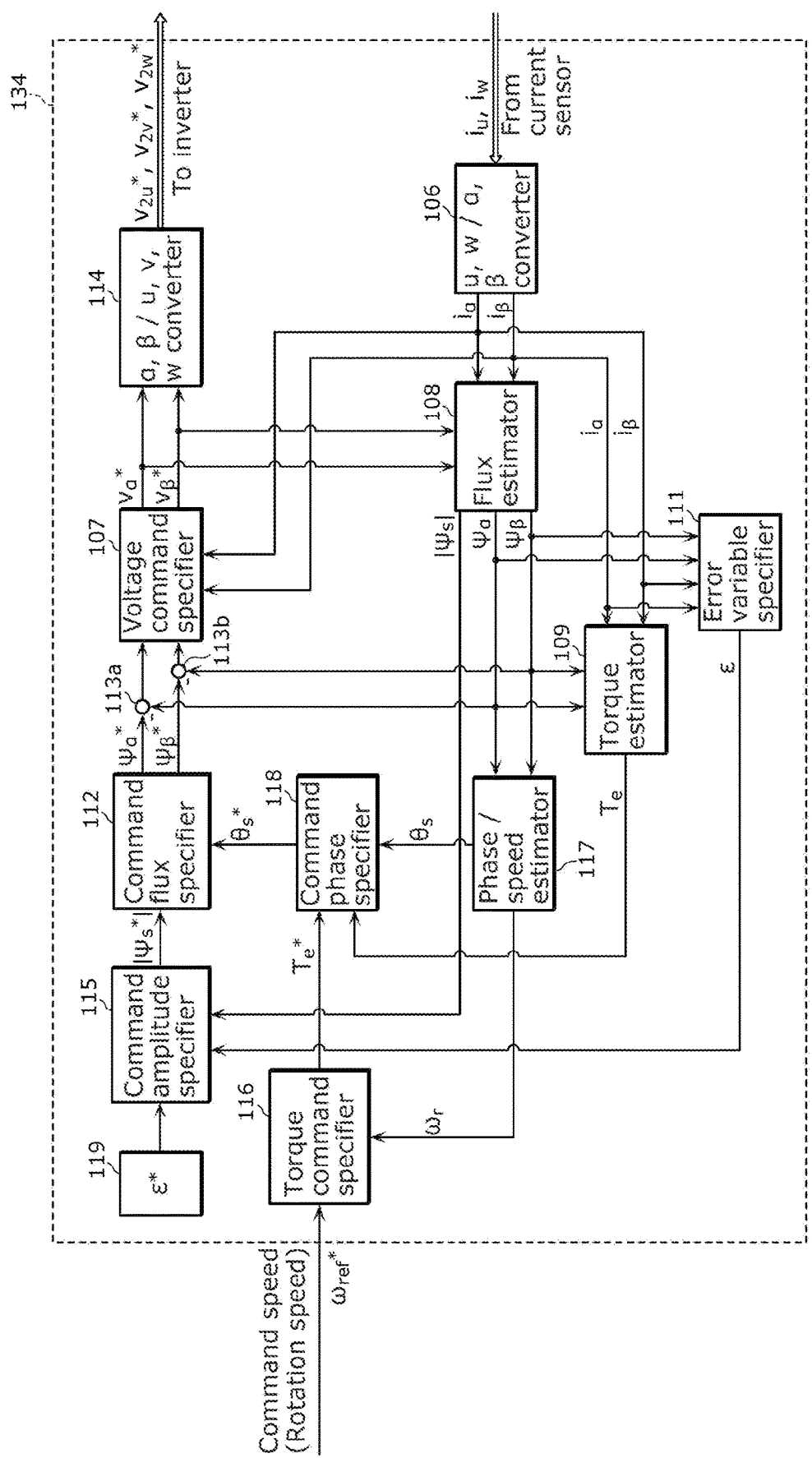
FIG. 4 is a block diagram of a position sensorless controller according to Embodiment 1.

As illustrated in FIG. 4, position sensorless controller 134 includes u, w/α, β converter (second two-phase/two-phase coordinate converter) 106, voltage command specifier (second voltage command specifier) 107, flux estimator 108, torque estimator 109, phase/speed estimator 117, torque command specifier 116, command phase specifier 118, command amplitude specifier 115, target value setter 119, error variable specifier 111, command flux specifier 112, α-axis flux deviation calculator 113a, β-axis flux deviation calculator 113b, and α, β/u, v, w converter (second two-phase/three-phase coordinate converter) 114.

In position sensorless controller 134, phase currents $i_u$ and $i_w$ are converted into axis currents $i_\alpha$ and $i_\beta$ (second axis currents) by u, w/α, β converter 106. Axis currents $i_\alpha$ and $i_\beta$ are given as a collective expression of the α-axis current $i_\alpha$ and the β-axis current $i_\beta$ on the α-β coordinates of synchronous rotary machine 102. The rotary machine flux is estimated (estimated flux $\Psi_s$ is obtained) by flux estimator 108. An α-axis component and a β-axis component of estimated flux $\Psi_s$ are respectively expressed as estimated fluxes $\Psi_\alpha$ and $\Psi_\beta$. The speed of synchronous rotary machine 102 and the phase of the rotary machine flux are estimated (estimated speed (rotation speed) $\omega_r$ and estimated phase $\theta_s$ of estimated flux $\Psi_s$ are obtained) from estimated flux $\Psi_s$ by phase/speed estimator 117. A motor torque is estimated (estimated torque $T_e$ is obtained) from estimated flux $\Psi_s$ and axis currents $i_\alpha$ and $i_\beta$ by torque estimator 109. Command torque $T_e^*$ is generated from estimated speed $\omega_r$ and command speed (rotation speed) $\omega_{ref}^*$ by torque command specifier 116. Command torque $T_e^*$ represents a torque to be followed by the motor torque. Error variable ε indicating the reactive power components is generated from estimated flux $\Psi_s$ and axis currents $i_\alpha$ and $i_\beta$ by error variable specifier 111. A target value of error variable ε is set by target value setter 119. Feedback control using error variable ε is executed by command amplitude specifier 115, whereby command amplitude $|\Psi_s^*|$ is generated. Here, when switcher 133 to be described later controls the switching from the current synchronous operation to the flux control operation (here, the position sensorless flux control operation), amplitude $|\Psi_s|$ of the estimated flux before the switching to the flux control operation is given to the above-described feedback control by flux estimator 108, as the initial value of command amplitude $|\Psi_s^*|$ immediately after the switching to the flux control operation. Command phase $\theta_s^*$ of command flux vector $\Psi_s^*$ is obtained from estimated phase $\theta_s$ of estimated flux $\Psi_s$, command torque $T_e^*$, and estimated torque $T_e$ by command phase specifier 118. Command flux vector $\Psi_s^*$ is obtained from command amplitude $|\Psi_s^*|$ and command phase $\theta_s^*$ by command flux specifier 112. An α-axis component and a β-axis component of command flux vector $\Psi_s^*$ are respectively expressed as α-axis command flux $\Psi_\alpha^*$ and β-axis command flux $\Psi_\beta^*$. Deviation (flux deviation) $\Delta\Psi_\alpha$ between α-axis command flux $\Psi_\alpha^*$ and estimated flux $\Psi_\alpha$ is obtained by α-axis flux deviation calculator 113a. Deviation (flux deviation) $\Delta\Psi_\beta$ between β-axis command flux $\Psi_\beta^*$ and estimated flux $\Psi_\beta$ is obtained by β-axis flux deviation calculator 113b. Command axis voltages $v_\alpha^*$ and $v_\beta^*$ (second axis voltages) are obtained from flux deviations $\Delta\Psi_\alpha$ and $\Delta\Psi_\beta$ and axis currents $i_\alpha$ and $i_\beta$ by voltage command specifier 107. Command axis voltages $v_\alpha^*$ and $v_\beta^*$ are given as a collective expression of α-axis command axis voltage $v_\alpha^*$ and β-axis command axis voltage $v_\beta^*$ on the α-β coordinates of synchronous rotary machine 102. Command axis voltages $v_\alpha^*$ and $v_\beta^*$ are converted into command voltage vectors $v_{2u}^*$, $v_{2v}^*$, and $v_{2w}^*$ by α, β/u, v, w converter 114.

In the position sensorless flux control operation, through such control, the motor torque follows command torque $T_e^*$, and the rotary machine flux follows command flux vector $\Psi_s^*$. As a result, the speed follows command speed $\Omega_{ref}^*$. In the case where the expression that "position sensorless controller 134 executes the position sensorless flux control operation of setting the command amplitude such that the amplitude of the rotary machine flux converges with the target amplitude" is adopted as described above, the "target amplitude" corresponds to command amplitude $|\Psi_s^*|$. Considering this, command amplitude $|\Psi_s^*|$ may be referred to below as target amplitude $|\Psi_s^*|$.

Figure 5:
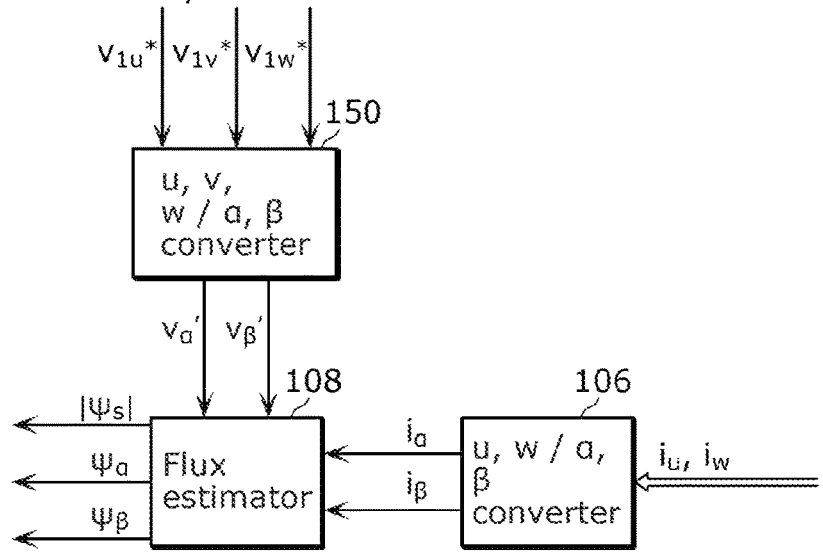
FIG. 5 is a diagram for describing a method of specifying an estimated flux when a current synchronous operation is executed.

When the position sensorless flux control operation is executed, as illustrated in FIG. 4, estimated flux $\Psi_s$ is obtained from axis currents $i_\alpha$ and $i_\beta$ and command axis voltages $v_\alpha^*$ and $v_\beta^*$, using flux estimator 108. On the other hand, when the current synchronous operation is executed, estimated flux $\Psi_s$ is obtained from axis currents $i_\alpha$ and $i_\beta$ and command voltage vectors $v_{1u}^*$, $v_{1v}^*$, and $v_{1w}^*$, using flux estimator 108. Specifically, as illustrated in FIG. 5, command voltage vectors $v_{1u}^*$, $v_{1v}^*$, and $v_{1w}^*$ are converted into reference axis voltages $v_\alpha'$ and $v_\beta'$, using u, v, w/α, β converter (three-phase/two-phase coordinate converter) 150. After that, estimated flux $\Psi_s$ is obtained from axis currents $i_\alpha$ and $i_\beta$ and reference axis voltages $v_\alpha'$ and $v_\beta'$ by flux estimator 108.

The expression of "the current synchronous operation of supplying synchronous rotary machine 102 with the current for the current synchronous operation" is not intended to essentially use the command axis currents in the current synchronous operation. The synchronous operation can also be executed without using the command axis currents. For example, a voltage synchronous operation using the command axis voltages may be executed. Details of the synchronous operation in this case are obvious to those skilled in the art, and hence description thereof is omitted. Moreover, in the current synchronous operation of Embodiment 1, other command than command torque $T_e^*$ is used. Then, after the switching to the position sensorless flux control operation, control using command torque $T_e^*$ is started.

Herein, axis currents $i_d$ and $i_q$ mean not currents that actually flow in synchronous rotary machine 102 but current values transmitted as information. Similarly, command axis currents $i_d^*$ and $i_q^*$, command axis voltages $v_d^*$ and $v_q^*$, command speed $\omega_{ref}^*$, rotor position θ, and command voltage vectors $v_{1u}^*$, $v_{1v}^*$, and $v_{1w}^*$ mean values transmitted as information. The same also applies to axis currents $i_\alpha$ and $i_\beta$, command axis voltages $v_\alpha^*$ and $v_\beta^*$, estimated flux $\Psi_s$, estimated phase $\theta_s$, estimated torque $T_e$, command torque $T_e^*$, command amplitude $|\Psi_s^*|$ (target amplitude $|\Psi_s^*|$), command flux vector $\Psi_s^*$, command voltage vectors $v_{2u}^*$, $v_{2v}^*$, and $v_{2w}^*$, command voltage vectors $v_u^*$, $v_v^*$, and $v_w^*$, and the like.

Constituent elements of current synchronous controller 131 illustrated in FIG. 3 are described below.

(Integrator 128)

Integrator 128 acquires command speed $\omega_{ref}^*$, and accumulates (integrates) command speed $\omega_{ref}^*$. In this way, integrator 128 obtains rotor position θ. Specifically, integrator 128 calculates rotor position θ according to Equation (1). s is a Laplace operator. Integrator 128 is a known integrator.

[Math. 1]

$$\theta = \frac{1}{s}\omega_{ref}^* \tag{1}$$

(u, w/d, q Converter 127)

u, w/d, q converter 127 acquires rotor position θ, and converts phase currents $i_u$ and $i_w$ into axis currents $i_d$ and $i_q$ using rotor position θ. Specifically, u, w/d, q converter 127 converts phase currents $i_u$ and $i_w$ into axis currents $i_d$ and $i_q$ according to Equations (2) and (3), and outputs axis currents $i_d$ and $i_q$.

[Math. 2]

$$i_v = -(i_u + i_w) \tag{2}$$

[Math. 3]

$$\begin{bmatrix} i_d \\ i_q \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} i_u \\ i_v \\ i_w \end{bmatrix} \tag{3}$$

(Commander of Current for Current Synchronous Operation 124)

Commander of current for current synchronous operation 124 generates command axis currents $i_d^*$ and $i_q^*$, and outputs command axis currents $i_d^*$ and $i_q^*$. Command axis currents $i_d^*$ and $i_q^*$ correspond to currents for the current synchronous operation that are to be supplied to synchronous rotary machine 102. In Embodiment 1, command axis currents $i_d^*$ and $i_q^*$ are currents determined in advance. Moreover, command axis currents $i_d^*$ and $i_q^*$ are currents each having a constant magnitude. Note that command axis currents $i_d^*$ and $i_q^*$ are normally constant, but may be variable. In Embodiment 1, d-axis command axis current $i_d^*$ is zero. Specifically, commander of current for current synchronous operation 124 generates command axis currents $i_d^*$ and $i_q^*$ according to Equation (4), and outputs command axis currents $i_d^*$ and $i_q^*$.

[Math. 4]

$$\begin{bmatrix} i_d^* \\ i_q^* \end{bmatrix} = \begin{bmatrix} 0 \\ I_{q\_douki} \end{bmatrix} \tag{4}$$

(Voltage Command Specifier 125)

Voltage command specifier 125 generates command axis voltages $v_d^*$ and $v_q^*$ from axis currents $i_d$ and $i_q$ and command axis currents $i_d^*$ and $i_q^*$. Command axis voltages $v_d^*$ and $v_q^*$ are specified such that axis currents $i_d$ and $i_q$ follow command axis currents $i_d^*$ and $i_q^*$. Specifically, voltage command specifier 125 generates and outputs command axis voltages $v_d$ and $v_q^*$ according to Equations (5) and (6). $K_{cdP}$ and $K_{cqP}$ in Equations (5) and (6) are proportional gains. $K_{cdI}$ and $K_{cqI}$ therein are integration gains. Voltage command specifier 125 is a known PI compensator.

[Math. 5]

$$v_d^*(K_{cdP}+K_{cdI/s})(i_d^*-i_d) \tag{5}$$

[Math. 6]

$$v_q^*(K_{cdP}+K_{cqI/s})(i_q^*-i_q) \tag{6}$$

(d, q/u, v, w Converter 126)

d, q/u, v, w converter 126 converts command axis voltages $v_d^*$ and $v_q^*$ into command voltage vectors $v_{1u}^*$, $v_{1v}^*$, and $v_{1w}^*$ using rotor position θ. Specifically, d, q/u, v, w converter 126 converts command axis voltages $v_d^*$ and $v_q^*$ into command voltage vectors $v_{1u}^*$, $v_{1v}^*$, and $v_{1w}^*$ according to Equation (7), and outputs command voltage vectors $v_{1u}^*$, $v_{1v}^*$, and $v_{1w}^*$.

[Math. 7]

$$\begin{bmatrix} v_{1u}^* \\ v_{1v}^* \\ v_{1w}^* \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix}^{-1} \begin{bmatrix} v_d^* \\ v_q^* \end{bmatrix} \tag{7}$$

Note that current synchronous controller 131 can also be configured such that rotor position θ can be obtained according to a method other than the method of accumulating command speed $\omega_{ref}^*$ by integrator 128. Rotor position θ may be a value given from the outside. For example, rotor position θ can be given from a higher-level control device to current synchronous controller 131.

Constituent elements of position sensorless controller 134 illustrated in FIG. 4 are described below.

(u, w/α, β Converter 106)

u, w/α, β converter 106 converts phase currents $i_u$ and $i_w$ into axis currents $i_\alpha$ and $i_\beta$. Specifically, u, w/α, β converter 106 converts phase currents $i_u$ and $i_w$ into axis currents $i_\alpha$ and $i_\beta$ according to Equations (8) and (9), and outputs axis currents $i_\alpha$ and $i_\beta$.

[Math. 8]

$$i_\alpha = \sqrt{\frac{3}{2}} i_u \tag{8}$$

[Math. 9]

$$i_\beta = -\frac{1}{\sqrt{2}} i_u - \sqrt{2} i_w \tag{9}$$

(Flux Estimator 108)

When the position sensorless flux control operation is executed, flux estimator 108 obtains estimated flux $\Psi_s$ (estimated fluxes $\Psi_\alpha$ and $\Psi_\beta$) from axis currents $i_\alpha$ and $i_\beta$ and command axis voltages $v_\alpha^*$ and $v_\beta^*$. Specifically, flux estimator 108 obtains estimated fluxes $\Psi_\alpha$ and $\Psi_\beta$ and absolute value $|\Psi_s^*|$ of estimated flux $\Psi_s$ using Equations (10), (11), and (12). $\Psi_\alpha|_{t=0}$ and $\Psi_\beta|_{t=0}$ in Equations (10) and (11) are initial values of estimated fluxes $\Omega_\alpha$ and $\Psi_\beta$, respectively. R in each of Equations (10) and (11) is a winding resistance of synchronous rotary machine 102. In the case where flux estimator 108 is incorporated in a digital control device such as the DSP and the microcomputer, an integrator necessary for calculation in Equations (10) and (11) can be configured by a discrete system. In this case, values deriving from the present control cycle may be added/subtracted to/from estimated fluxes $\Psi_\alpha$ and $\Psi_\beta$ in the previous control cycle.

[Math. 10]

$$\Psi_\alpha = \int (v_\alpha^* - Ri_\alpha) dt + \Psi_\alpha|_{t=0} \tag{10}$$

[Math. 11]

$$\Psi_\beta = \int (v_\beta^* - Ri_\beta) dt + \Psi_\beta|_{t=0} \tag{11}$$

[Math. 12]

$$|\Psi_s| = \sqrt{\Psi_\alpha^2 + \Psi_\beta^2} \tag{12}$$

Flux estimator 108 is used also when the current synchronous operation is executed. In this case, flux estimator 108 obtains estimated fluxes $\Psi_\alpha$ and $\Psi_\beta$ based on axis currents $i_\alpha$ and $i_\beta$ and command voltage vectors $v_{1u}^*$, $v_{1v}^*$, and $v_{1w}^*$, in cooperation with u, v, w/$\alpha$, $\beta$ converter 150 (FIG. 5). Specifically, u, v, w/$\alpha$, $\beta$ converter 150 converts command voltage vectors $v_{1u}^*$, $v_{1v}^*$, and $v_{1w}^*$ into reference axis voltages $v_\alpha'$ and $v_\beta'$ using Equations (13) and (14). Flux estimator 108 obtains estimated fluxes $\Psi_\alpha$ and $\Psi_\beta$ from axis currents $i_\alpha$ and $i_\beta$ and reference axis voltages $v_\alpha'$ and $v_\beta'$. When estimated fluxes $\Psi_\alpha$ and $\Psi_\beta$ are obtained, expressions in which command axis voltages $v_\alpha^*$ and $v_\beta^*$ in Equations (10) and (11) are respectively replaced with reference axis voltages $v_\alpha'$ and $v_\beta'$ are used. Similarly to the period in which the position sensorless flux control operation is executed, axis currents $i_\alpha$ and $i_\beta$ are specified by current sensors 105a and 105b (first current sensor 105a and second current sensor 105b) and u, w/$\alpha$, $\beta$ converter 106.

[Math. 13]

$$v_\alpha' = \sqrt{\frac{3}{2}} v_{1u}^* \tag{13}$$

[Math. 14]

$$v_\beta' = -\frac{1}{\sqrt{2}} v_{1u}^* - \sqrt{2} v_{1w}^* \tag{14}$$

(Torque Estimator 109)

Torque estimator 109 obtains estimated torque $T_e$ from axis currents $i_\alpha$ and $i_\beta$ and estimated flux $\Psi_s$ (estimated fluxes $\Psi_\alpha$ and $\Psi_\beta$). Specifically, torque estimator 109 obtains estimated torque $T_e$ using Equation (15). $P_n$ in Equation (15) is the number of pole pairs of synchronous rotary machine 102.

[Math. 15]

$$T_e = P_n(\Psi_\alpha i_\beta - \Psi_\beta i_\alpha) \tag{15}$$

(Phase/Speed Estimator 117)

Phase/speed estimator 117 obtains estimated phase $\theta_s$ of estimated flux $\Psi_s$ from estimated flux $\Psi_s$ (estimated fluxes $\Psi_\alpha$ and $\Psi_\beta$). Specifically, phase/speed estimator 117 obtains estimated phase $\theta_s$ of estimated flux $\Psi_s$ according to Equation (16). Moreover, phase/speed estimator 117 obtains estimated speed $\omega_r$ according to Equation (17), using estimated phase $\theta_s(n)$ obtained in the present control cycle and estimated phase $\theta_s(n-1)$ obtained in the previous control cycle. Phase/speed estimator 117 is a known phase estimator. Here, $T_s$ means a control cycle (sampling cycle) in this control. n is a time step.

[Math. 16]

$$\theta_s = \tan^{-1}(\Psi_\beta/\Psi_\alpha) \tag{16}$$

[Math. 17]

$$\omega_r = \frac{\theta_s(n) - \theta_s(n-1)}{T_s} \tag{17}$$

(Torque Command Specifier 116)

Torque command specifier 116 obtains command torque $T_e^*$ from command speed $\omega_{ref}^*$ and estimated speed $\omega_r$. Specifically, torque command specifier 116 obtains command torque $T_e^*$ according to Equation (18). $K_{sP}$ in Equation (18) is a proportional gain. $K_{sI}$ therein is an integration gain. Torque command specifier 116 is a known PI compensator.

[Math. 18]

$$T_e^* = (K_{sP} + K_{sI}/s)(\omega_{ref}^* - \omega_r) \tag{18}$$

(Error Variable Specifier 111)

Error variable specifier 111 calculates error variable ε indicating the reactive power components from virtual inductance (an inductance of synchronous rotary machine 102) $L_m$, axis currents $i_\alpha$ and $i_\beta$, and estimated flux $\Psi_s$ (estimated fluxes $\Psi_\alpha$ and $\Psi_\alpha$). Specifically, first, error variable specifier 111 estimates armature reaction flux (obtains estimated armature reaction flux $L_m i_a$). An α-axis component and a β-axis component of estimated armature reaction flux $L_m i_a$ are respectively expressed as estimated armature reaction flux $L_m i_\alpha$ and estimated armature reaction flux $L_m i_\beta$. Estimated armature reaction flux $L_m i_\alpha$ and estimated armature reaction flux $L_m i_\beta$ are products of virtual inductance $L_m$ and axis currents $i_\alpha$ and $i_\beta$, respectively. Next, error variable specifier 111 estimates an estimated magnet flux (obtains estimated magnet flux $\Psi'_{ae}$) of the permanent magnet of synchronous rotary machine 102 from estimated flux $\Psi_s$ (estimated fluxes $\Psi_\alpha$ and $\Psi_\beta$) and estimated armature reaction flux $L_m i_a$ (estimated armature reaction fluxes $L_m i_\alpha$ and $L_m i_\beta$). An α-axis component and a β-axis component of estimated magnet flux $\Psi_{ae}$ are respectively expressed as estimated magnet fluxes $\Psi'_{ae\alpha}$ and $\Psi'_{ae\beta}$. Specifically, as illustrated in Equations (19) and (20), error variable specifier 111 subtracts estimated armature reaction fluxes $L_m i_\alpha$ and $L_m i_\beta$ from estimated fluxes $\Psi_\alpha$ and $\Psi_\beta$ to thereby obtain estimated magnet fluxes $\Psi'_{ae\alpha}$ and $\Psi'_{ae\beta}$. Next, error variable specifier 111 calculates error variable ε from estimated magnet fluxes $\Psi'_{ae\alpha}$ and $\Psi'_{ae\beta}$ and axis currents $i_\alpha$ and $i_\beta$ according to Equation (21).

[Math. 19]

$$\Psi'_{ae\alpha} = \Psi_\alpha - L_m i_\alpha \tag{19}$$

[Math. 20]

$$\Psi'_{ae\beta} = \Psi_\beta - L_m i_\beta \qquad (20)$$

[Math. 21]

$$\varepsilon = \Psi'_{ae\alpha} i_\alpha + \Psi'_{ae\beta} i_\beta \qquad (21)$$

Figure 6A:
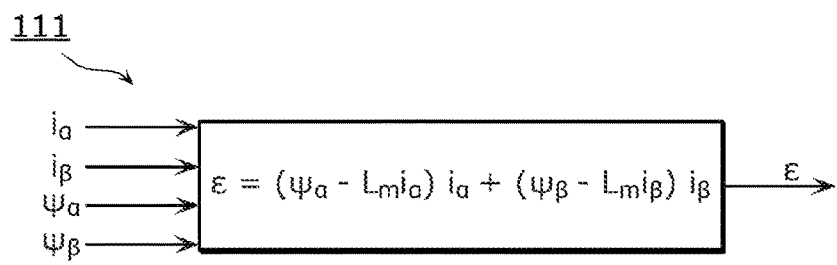
FIG. 6A is a block diagram of an error variable specifier according to Embodiment 1.

As illustrated in Equation (21) and FIG. 6A, error variable specifier 111 calculates, as error variable ε, an inner product (second inner product) of estimated magnet flux Ψ' of the permanent magnet of synchronous rotary machine 102 and detected current i of synchronous rotary machine 102.

Note that error variable ε can be obtained also by calculating an inner product (first inner product) of estimated flux Ψ of synchronous rotary machine 102 and detected current i of synchronous rotary machine 102.

Figure 6B:
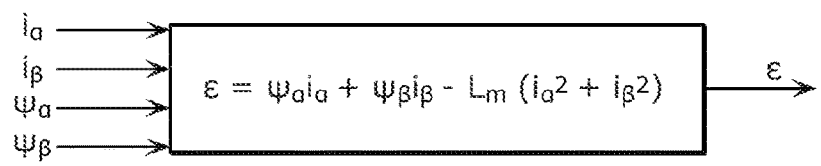
FIG. 6B is a block diagram of an error variable specifier according to Embodiment 1.

Therefore, as illustrated in Equation (22) and FIG. 6B, error variable specifier 111 may be configured to calculate, as error variable ε, the inner product (first inner product) of estimated flux Ψ of synchronous rotary machine 102 and detected current i of synchronous rotary machine 102, instead of the above-described second inner product.

[Math. 22]

$$\varepsilon = \Psi_\alpha i_\alpha + \Psi_\beta i_\beta - L_m(i_\alpha^2 + i_\beta^2) \qquad (22)$$

(Target Value Setter 119)

Target value setter 119 sets the target value of error variable ε, that is, target value ε* of the calculation result of the first inner product or the second inner product. Here, target value setter 119 sets the target value of the calculation result of the first inner product or the second inner product to zero or less. Note that the target value thereof may be set to a positive value in a low-speed region in which the speed is less than or equal to 10% of the maximum rotation speed. If the target value thereof is set to a positive value, a current that generates a field flux in a magnet flux direction of the permanent magnet of synchronous rotary machine 102 can be caused to flow. Therefore, an effect equivalent to an effect of increasing the magnetic force of the permanent magnet can be obtained.

Note that it is desirable that a maximum value of ε* be such a value that makes the field flux generated in the magnet flux direction of the permanent magnet less than 30% of the magnet flux of the permanent magnet.

(Command Amplitude Specifier 115)

Command amplitude specifier 115 executes the feedback control using error variable ε to thereby generate command amplitude |Ψ_s*|.

Figure 7:
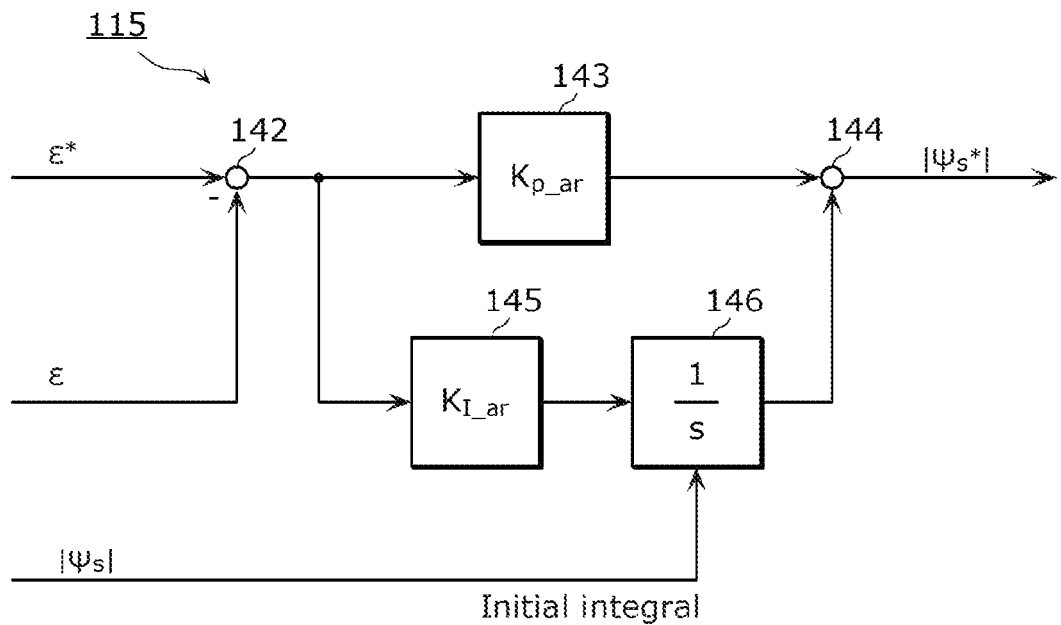
FIG. 7 is a block diagram of a command amplitude specifier according to Embodiment 1.

As illustrated in FIG. 7, command amplitude specifier 115 includes subtractor 142, P gain 143, I gain 145, integrator 146, and adder 144.

Absolute value |Ψ_s| of estimated flux Ψ_s is given as an initial integral from flux estimator 108 to integrator 146. According to this configuration, when switcher 133 to be described later controls the switching from the current synchronous operation to the flux control operation (here, the position sensorless flux control operation), amplitude |Ψ_s| of the estimated flux before the switching to the flux control operation is given to the above-described feedback control by flux estimator 108, as the initial value of command amplitude |Ψ_s| immediately after the switching to the flux control operation.

(Command Phase Specifier 118)

Command phase specifier 118 specifies command phase θ_s* of command flux vector Ψ_s* from estimated phase θ_s of estimated flux Ψ_s, command torque T_e*, and estimated torque T_e.

(Command Flux Specifier 112)

Command flux specifier 112 obtains command flux vector Ψ_s* (command fluxes Ψ_α* and Ψ_β* from command amplitude |Ψ_s*| and command phase θ_s*. Specifically, command flux specifier 112 obtains command fluxes Ψ_α* and Ψ_β* using Equations (23) and (24).

[Math. 23]

$$\Psi_\alpha^* = |\Psi_s^*| \cos\theta_s^* \qquad (23)$$

[Math. 24]

$$\Psi_\beta^* = |\Psi_s^*| \sin\theta_s^* \qquad (24)$$

(α-Axis Flux Deviation Calculator 113a and β-Axis Flux Deviation Calculator 113b)

α-axis flux deviation calculator 113a acquires command amplitude Ψ_α* and estimated flux Ψ_α, and obtains the deviation (flux deviation ΔΨ_α: Ψ_α*−Ψ_α) therebetween. β-axis flux deviation calculator 113b acquires command amplitude Ψ_β* and estimated flux Ψ_β, and obtains the deviation (flux deviation ΔΨ_β: Ψ_β*−Ψ_β) therebetween. Known operators may be used as α-axis flux deviation calculator 113a and β-axis flux deviation calculator 113b.

(Voltage Command Specifier 107)

Voltage command specifier 107 obtains command axis voltages v_α* and v_β* from flux deviations ΔΩ_α and ΔΨ_β and axis currents i_α and i_β. Specifically, voltage command specifier 107 obtains α-axis command axis voltage v_α* using Equation (25). Moreover, voltage command specifier 107 obtains β-axis command axis voltage v_β* using Equation (26).

[Math. 25]

$$v_\alpha^* = \frac{\Delta\Psi_\alpha}{T_s} + R i_\alpha \qquad (25)$$

[Math. 26]

$$v_\beta^* = \frac{\Delta\Psi_\beta}{T_s} + R i_\beta \qquad (26)$$

(α, β/u, v, w Converter 114)

α, β/u, v, w converter 114 converts command axis voltages v_α* and v_β* into command voltage vectors v_{2u}*, v_{2v}*, and v_{2w}**. Specifically, α, β/u, v, w converter 114 converts command axis voltages v_α* and v_β* into command voltage vectors v_{2u}*, v_{2v}*, and v_{2w}* according to Equation (27), and outputs command voltage vectors v_{2u}*, v_{2v}*, and v_{2w}*

[Math. 27]

$$\begin{bmatrix} v_{2u}^* \\ v_{2v}^* \\ v_{2w}^* \end{bmatrix} = \begin{bmatrix} \sqrt{2/3} & 0 \\ -\sqrt{1/6} & \sqrt{1/2} \\ -\sqrt{1/6} & -\sqrt{1/2} \end{bmatrix} \begin{bmatrix} v_\alpha^* \\ v_\beta^* \end{bmatrix} \qquad (27)$$

With reference back to FIG. 1, remaining constituent elements of rotary machine control device 100 and constituent elements connected to rotary machine control device 100 are described below.

(First Current Sensor 105a and Second Current Sensor 105b)

Known current sensors can be used as first current sensor 105a and second current sensor 105b. In Embodiment 1, first current sensor 105a is provided so as to measure phase current $i_u$ flowing in the u-phase. Second current sensor 105b is provided so as to measure phase current $i_w$ flowing in the w-phase. Note that first current sensor 105a and second current sensor 105b may be provided so as to measure currents in a combination of two phases other than the two phases of the u-phase and the w-phase.

(Switcher 133)

Figure 8:
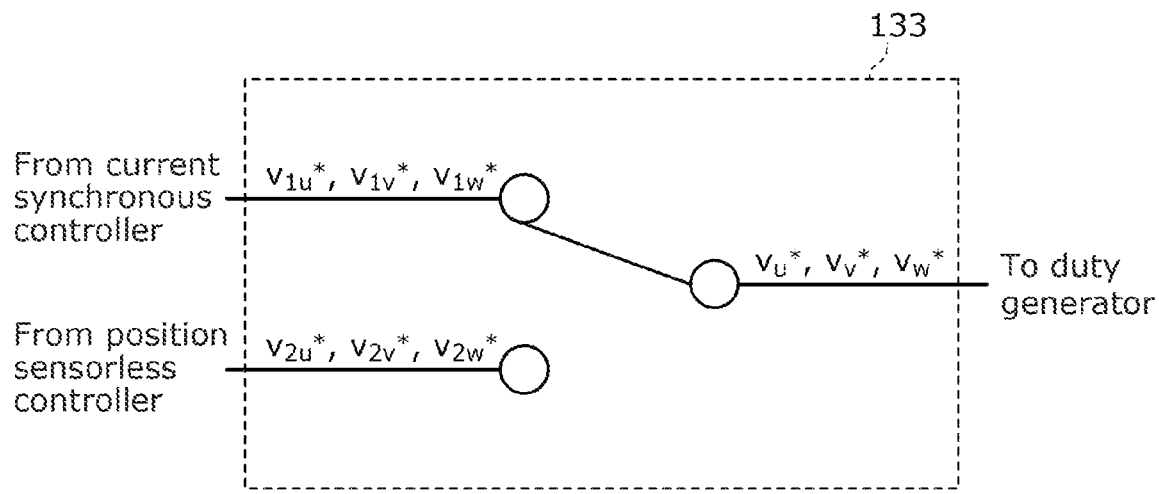
FIG. 8 is a configuration diagram of a switcher according to Embodiment 1.

Switcher 133 selects one of command voltage vectors $v_{1u}^*$, $v_{1v}^*$, and $v_{1w}^*$ and command voltage vectors $v_{21u}^*$, $v_{2v}^*$, and $v_{1w}^*$ and outputs the selected one as command voltage vectors $v_u^*$, $v_v^*$, and $v_w^*$. That is, switcher 133 controls the switching from the current synchronous operation to the flux control operation (here, the position sensorless flux control operation). Switcher 133 is, for example, an analog switch or a multiplexer. Note that switcher 133 may be configured by software in the microcomputer. FIG. 8 is a configuration diagram of switcher 133.

(Duty Generator 103)

Duty generator 103 generates duties $D_u$, $D_v$, and $D_w$ from command voltage vectors $v_u^*$, $v_v^*$, and $v_w^*$. In Embodiment 1, duty generator 103 converts respective components of command voltage vectors $v_u^*$, $v_v^*$, and $v_w^*$ into duties $D_u$, $D_v$, and $D_w$ in the respective phases. A method used for a general voltage PWM inverter may be used as a method of generating duties $D_u$, $D_v$, and $D_w$. For example, duties $D_u$, $D_v$, and $D_w$ may be obtained by dividing command voltage vectors $v_u^*$, $v_v^*$, and $v_w^*$ by a half value of voltage value $V_{dc}$ of a DC power supply of PWM inverter 104 to be described later. In this case, duty $D_u$ is $2 \times v_u^*/V_{dc}$. Duty $D_v$ is $2 \times v_v^*/V_{dc}$. Duty $D_w$ is $2 \times v_w^*/V_{dc}$. Duty generator 103 outputs duties $D_u$, $D_v$, and $D_w$.

(PWM Inverter 104)

PWM inverter 104 includes the DC power supply and a conversion circuit, and the conversion circuit converts a DC voltage into voltage vectors $v_u$, $v_v$, and $v_w$ through PWM control. PWM inverter 104 applies voltage vectors $v_u$, $v_v$, and $v_w$ obtained after the conversion to synchronous rotary machine 102.

(Synchronous Rotary Machine 102)

Synchronous rotary machine 102 is a control target of rotary machine control device 100. The voltage vectors are applied to synchronous rotary machine 102 by PWM inverter 104. "The voltage vectors are applied to synchronous rotary machine 102" means that a voltage is applied to each of the three phases (the U-phase, the V-phase, and the W-phase) on the three-phase AC coordinates in synchronous rotary machine 102. In Embodiment 1, synchronous rotary machine 102 is controlled such that each of the three phases (the U-phase, the V-phase, and the W-phase) is any one selected from two types of a high-voltage phase having a relatively high voltage and a low-voltage phase having a relatively low voltage.

Synchronous rotary machine 102 is, for example, a permanent magnet synchronous motor. Examples of the permanent magnet synchronous motor include an interior permanent magnet synchronous motor (IPMSM) and a surface permanent magnet synchronous motor (SPMSM). The IPMSM has saliency in which d-axis inductance Ld and q-axis inductance Lq are different from each other (generally, inverse saliency of Lq>Ld), and can use reluctance torque in addition to magnet torque. Therefore, the drive efficiency of the IPMSM is extremely high. A synchronous reluctance motor can also be used as synchronous rotary machine 102.

(Consideration)

As described above, in rotary machine control device 100, command amplitude specifier 115 of position sensorless controller 134 executes the feedback control using error variable c, to thereby generate command amplitude $|\Psi_s^*|$. At this time, absolute value $|\Psi_s|$ of estimated flux $\Psi_s$ is given as the initial integral from flux estimator 108 to integrator 146 of command amplitude specifier 115. According to this configuration, when switcher 133 controls the switching from the current synchronous operation to the flux control operation (here, the position sensorless flux control operation), amplitude $|\Psi_s|$ of the estimated flux before the switching to the flux control operation is given to the above-described feedback control by flux estimator 108, as the initial value of command amplitude $|\Psi_s^*|$ immediately after the switching to the flux control operation.

Therefore, according to rotary machine control device 100 having the above-described configuration, the voltage surge that occurs at the time of the switching from the current synchronous operation to the flux control operation can be suppressed.

Accordingly, according to rotary machine control device 100 having the above-described configuration, the stability in the activation period of the rotary machine control device that performs a flux control operation which mainly uses the flux, such as the direct torque control, can be further improved.

Embodiment 2

Now, a rotary machine control device according to Embodiment 2 configured by changing part of rotary machine control device 100 according to Embodiment 1 is described. Here, for the rotary machine control device according to Embodiment 2, constituent elements similar to those of rotary machine control device 100 are assumed to have already been described, the same reference signs are given to these constituent elements, detailed description thereof is omitted, and different points from rotary machine control device 100 are mainly described.

Figure 9:
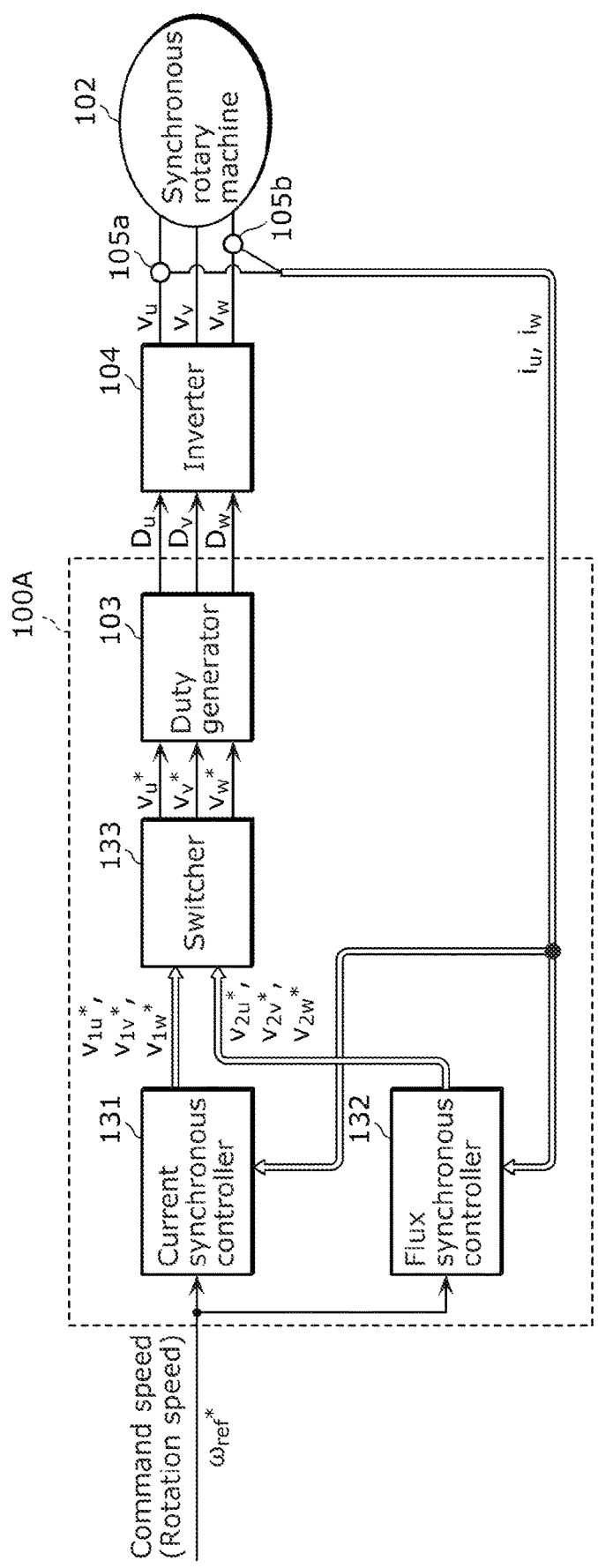
FIG. 9 is a block diagram of a rotary machine control device according to Embodiment 2.

FIG. 9 is a block diagram of rotary machine control device 100A according to Embodiment 2.

As illustrated in FIG. 9, rotary machine control device 100A is different from rotary machine control device 100 according to Embodiment 1 in that position sensorless controller 134 is changed to flux synchronous controller 132.

Flux synchronous controller 132 is configured to execute the flux synchronous operation of synchronous rotary machine 102. The flux synchronous operation is a type of flux control operation, and is an operation of: specifying the amount of movement that the phase of the estimated flux should move per control cycle; and specifying the phase of the command flux vector using the specified amount of movement.

Therefore, in rotary machine control device 100A, the switching from the current synchronous operation to the flux synchronous operation as the flux control operation is controlled by switcher 133.

Figure 10:
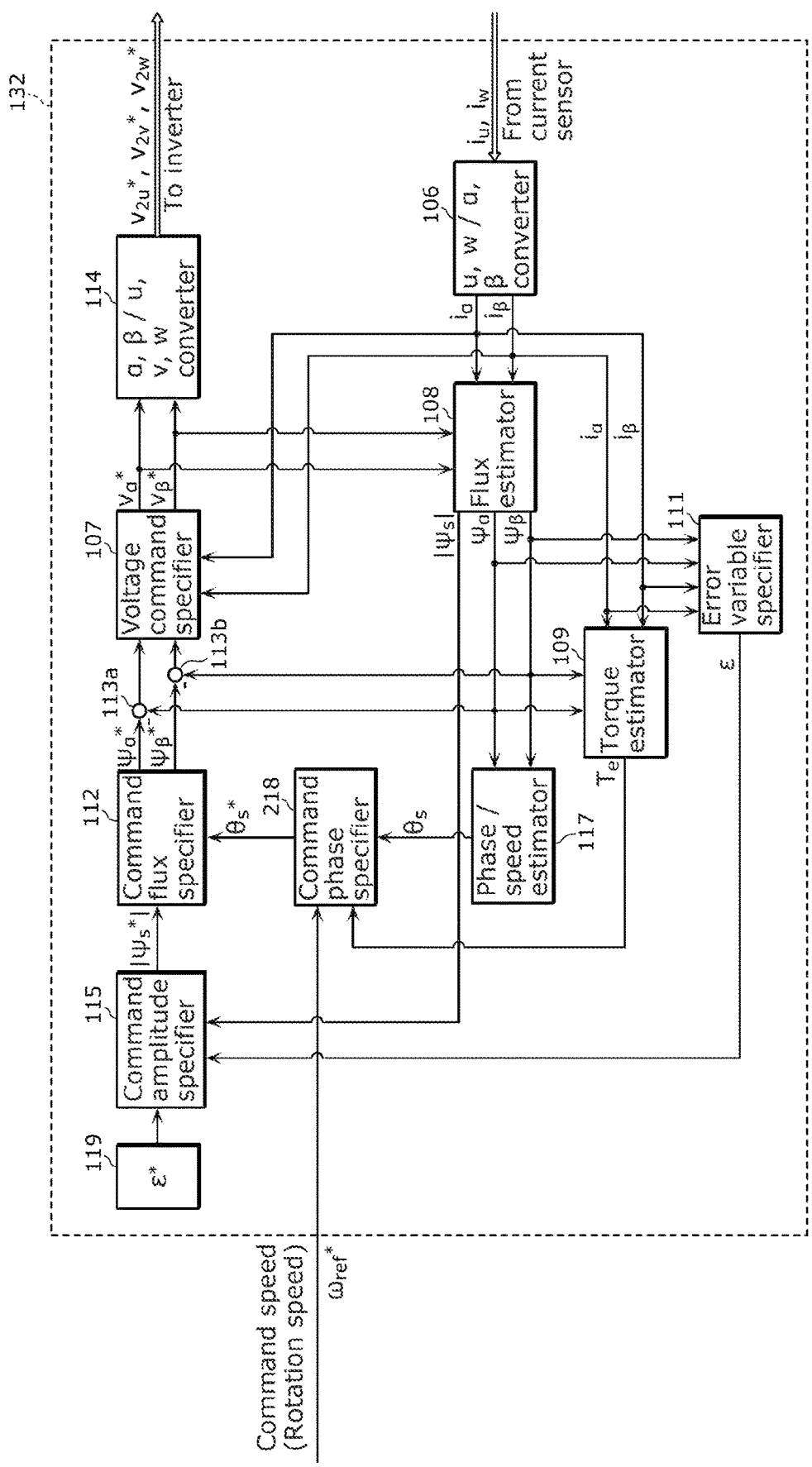
FIG. 10 is a block diagram of a flux synchronous controller according to Embodiment 2.

FIG. 10 is a block diagram of flux synchronous controller 132.

As illustrated in FIG. 10, flux synchronous controller 132 is different from position sensorless controller 134 according to Embodiment 1 in that: command phase specifier 118 is changed to command phase specifier 218; and torque command specifier 116 is deleted.

(Command Phase Specifier 218)

Command phase specifier 218 specifies command phase $\theta_s^*$ of command flux vector $\Psi_s^*$ from command speed $\omega_{ref}^*$ and estimated phase $\theta_s$ of estimated flux $\Psi_s$ or from command speed $\Psi_{ref}^*$, estimated torque $T_e$, and estimated phase $\theta_s$ of estimated flux $\Psi_s$.

Figure 11:
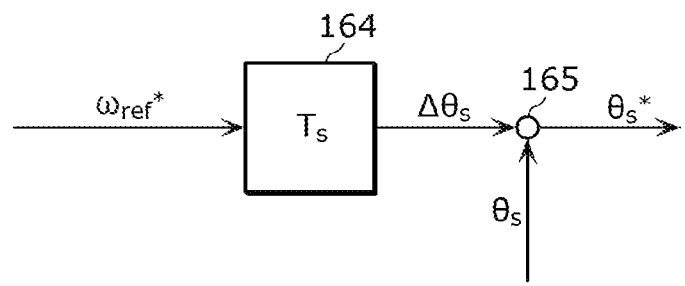
FIG. 11 is a block diagram of a command phase specifier according to Embodiment 2.

Command phase specifier 218 that specifies command phase $\theta_s^*$ of command flux vector $\Psi_s^*$ from command speed $\Psi_{ref}^*$ and estimated phase $\theta_s$ of estimated flux $\Psi_s$ may be, for example, command phase specifier 218A illustrated in FIG. 11.

Figure 12:
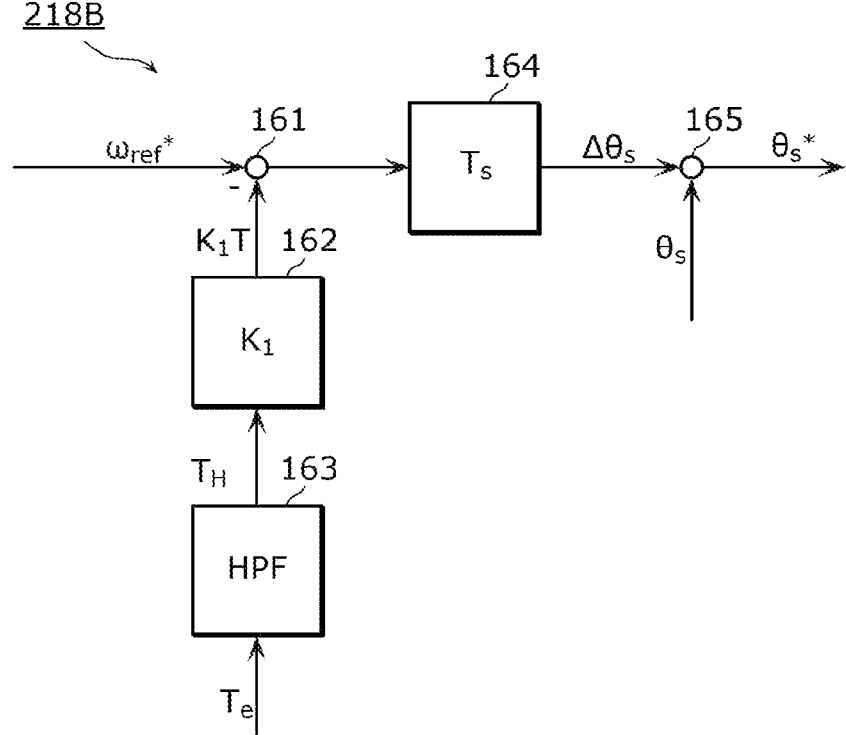
FIG. 12 is a block diagram of a command phase specifier according to Embodiment 2.
Figure 13:
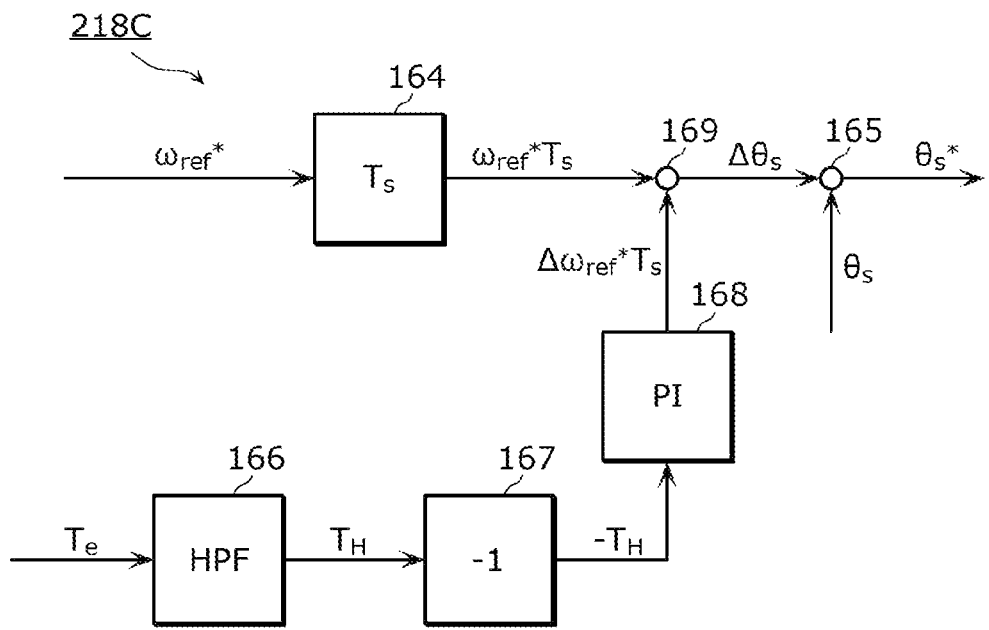
FIG. 13 is a block diagram of a command phase specifier according to Embodiment 2.
Figure 14:
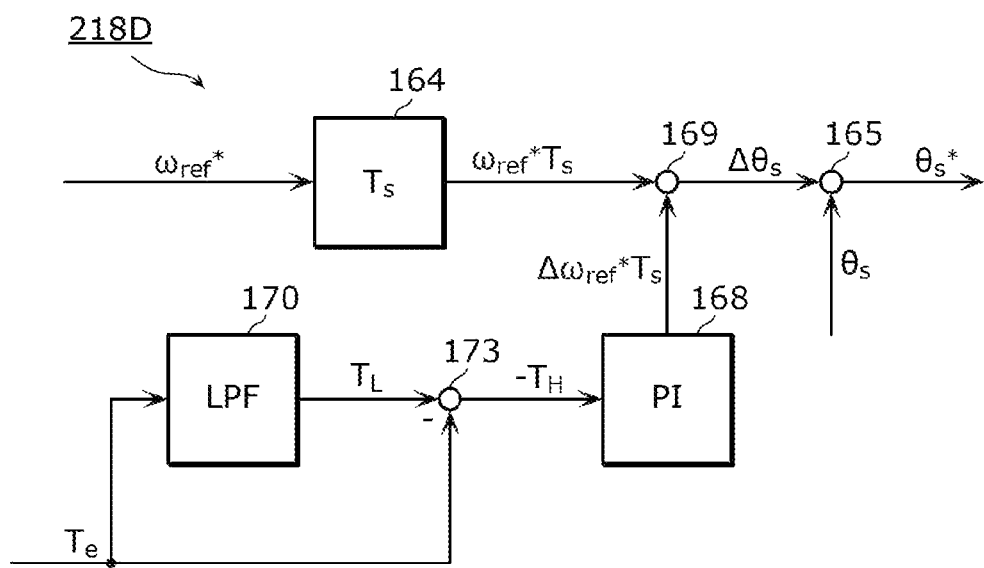
FIG. 14 is a block diagram of a command phase specifier according to Embodiment 2.

Command phase specifier 218 that specifies command phase $\theta_s^*$ of command flux vector $\Psi_s^*$ from command speed $\omega_{ref}^*$, estimated torque $T_e$, and estimated phase $\theta_s$ of estimated flux $\Psi_s$ may be, for example, command phase specifier 218B illustrated in FIG. 12, command phase specifier 218C illustrated in FIG. 13, or command phase specifier 218D illustrated in FIG. 14.

As illustrated in FIG. 11, command phase specifier 218A includes multiplier 164 and phase adder 165. Command phase specifier 218A specifies amount of movement $\Delta\theta_s$ that estimated phase $\theta_s$ of estimated flux $\Psi_s$ should move per control cycle, using command speed $\omega_{ref}^*$, and specifies command phase $\theta_s^*$ of command flux vector $\Psi_s^*$ using specified amount of movement $\Delta\theta_s$ and estimated phase $\theta_s$ of estimated flux $\Psi_s$.

As illustrated in FIG. 12, command phase specifier 218B includes high-pass filter 163, gain multiplier 162, speed deviation calculator 161, multiplier 164, and phase adder 165. Command phase specifier 218B specifies amount of movement $\Delta\theta_s$ that estimated phase $\theta_s$ of estimated flux $\Psi_s$ should move per control cycle, using command speed $\omega_{ref}^*$ and estimated torque $T_e$, and specifies command phase $\theta_s^*$ of command flux vector $\Psi_s^*$ using specified amount of movement $\Delta\theta_s$ and estimated phase $\theta_s$ of estimated flux $\Psi_s$.

As illustrated in FIG. 13, command phase specifier 218C includes multiplier 164, high-pass filter 166, sign inverter 167, PI compensator 168, adder 169, and phase adder 165. Command phase specifier 218C specifies amount of movement $\Delta\theta_s$ that estimated phase $\theta_s$ of estimated flux $\Psi_s$ should move per control cycle, using command speed $\omega_{ref}^*$ and estimated torque $T_e$, and specifies command phase $\theta_s^*$ of command flux vector $\Psi_s^*$ using specified amount of movement $\Delta\theta_s$ and estimated phase $\theta_s$ of estimated flux $\Psi_s$.

As illustrated in FIG. 14, command phase specifier 218D includes multiplier 164, low-pass filter 170, subtractor 173, PI compensator 168, adder 169, and phase adder 165. Command phase specifier 218D specifies amount of movement $\Delta\theta_s$ that estimated phase $\theta_s$ of estimated flux $\Psi_s$ should move per control cycle, using command speed $\omega_{ref}^*$ and estimated torque $T_e$, and specifies command phase $\theta_s^*$ of command flux vector $\omega_s^*$ using specified amount of movement $\Delta\theta_s$ and estimated phase $\theta_s$ of estimated flux $\Psi_s$.

According to the above-described configuration, command phase specifier 218 enables command phase $\theta_s^*$ of command flux vector $\Psi_s^*$ to follow estimated phase $\theta_s$ of estimated flux $\Psi_s$.

Therefore, in rotary machine control device 100A, when switcher 133 controls the switching from the current synchronous operation to the flux synchronous operation as the flux control operation, the estimated phase of the estimated flux before the switching to the flux control operation can be made coincident with the command phase of the command flux after the switching.

(Consideration)

As described above, according to rotary machine control device 100A having the above-described configuration, at the time of the switching from the current synchronous operation to the flux control operation, the estimated phase of the estimated flux before the switching to the flux control operation can be made coincident with the command phase of the command flux after the switching.

Therefore, according to rotary machine control device 100A having the above-described configuration, the voltage surge that occurs at the time of the switching from the current synchronous operation to the flux control operation can be further suppressed.

Embodiment 3

Now, a rotary machine control device according to Embodiment 3 configured by changing part of rotary machine control device 100 according to Embodiment 1 is described. Here, for the rotary machine control device according to Embodiment 3, constituent elements similar to those of rotary machine control device 100 are assumed to have already been described, the same reference signs are given to these constituent elements, detailed description thereof is omitted, and different points from rotary machine control device 100 are mainly described.

Figure 15:
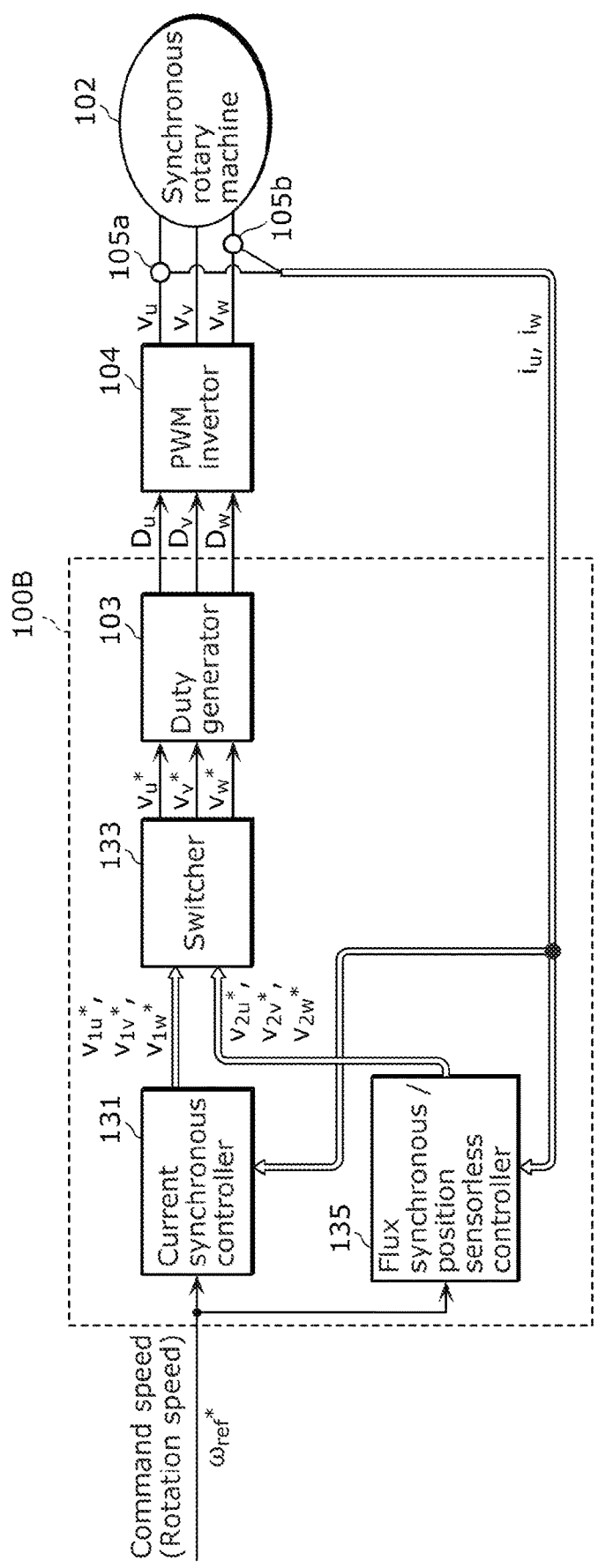
FIG. 15 is a block diagram of a rotary machine control device according to Embodiment 3.

FIG. 15 is a block diagram of rotary machine control device 100B according to Embodiment 3.

As illustrated in FIG. 15, rotary machine control device 100B is different from rotary machine control device 100 according to Embodiment 1 in that position sensorless controller 134 is changed to flux synchronous/position sensorless controller 135.

Flux synchronous/position sensorless controller 135 is configured to make switching to and execute any one of the flux synchronous operation and the position sensorless flux control operation of synchronous rotary machine 102.

Therefore, in rotary machine control device 1008, the switching from the current synchronous operation to the flux control operation is controlled by switcher 133, and the switching from the flux synchronous operation as the flux control operation to the position sensorless flux control operation as the flux control operation is controlled by flux synchronous/position sensorless controller 135.

Figure 16:
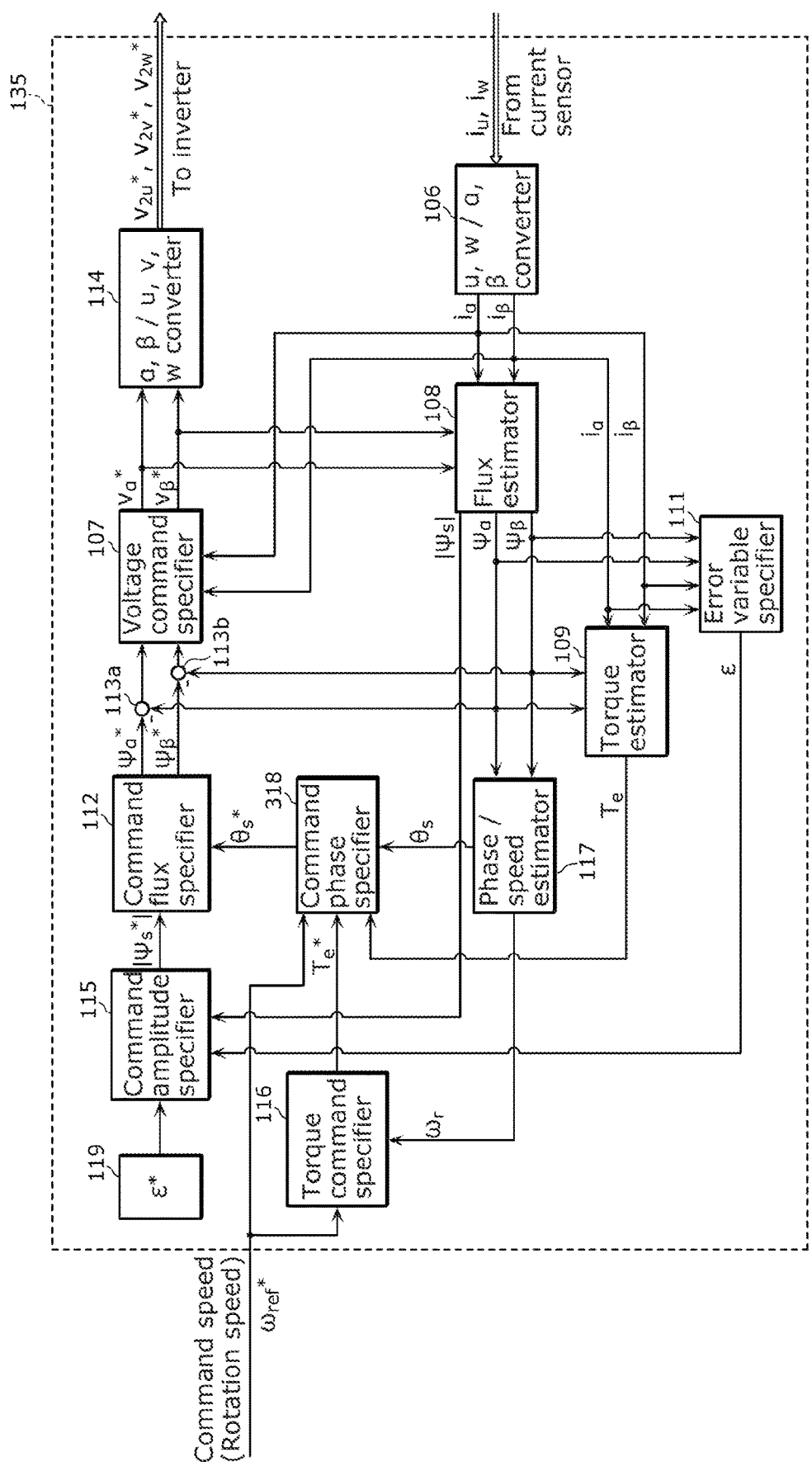
FIG. 16 is a block diagram of a flux synchronous/position sensorless controller according to Embodiment 3.

FIG. 16 is a block diagram of flux synchronous/position sensorless controller 135.

As illustrated in FIG. 16, flux synchronous/position sensorless controller 135 is different from position sensorless controller 134 according to Embodiment 1 in that command phase specifier 118 is changed to command phase specifier 318.

(Command Phase Specifier 318)

Command phase specifier 318 has: a function of specifying command phase $\theta_s^*$ of command flux vector $\Psi_s^*$ from command speed $\omega_{ref}^*$, estimated torque $T_e$, and estimated phase $\theta_s$ of estimated flux $\Psi_s$ (hereinafter, also referred to as a "first function"); and a function of specifying command phase $\theta_s^*$ of command flux vector $\Psi_s^*$ from command speed $\omega_{ref}^*$, command torque $T_e^*$, estimated torque $T_e$, and estimated phase $\theta_s$ of estimated flux $\Psi_s$ (hereinafter, also referred to as a "second function"), and command phase specifier 318 makes switching to and executes any one of these functions.

Flux synchronous/position sensorless controller 135 executes the flux synchronous operation in the case where command phase specifier 318 executes the first function. Flux synchronous/position sensorless controller 135 executes the position sensorless flux control operation in the case where command phase specifier 318 executes the second function.

Figure 17:
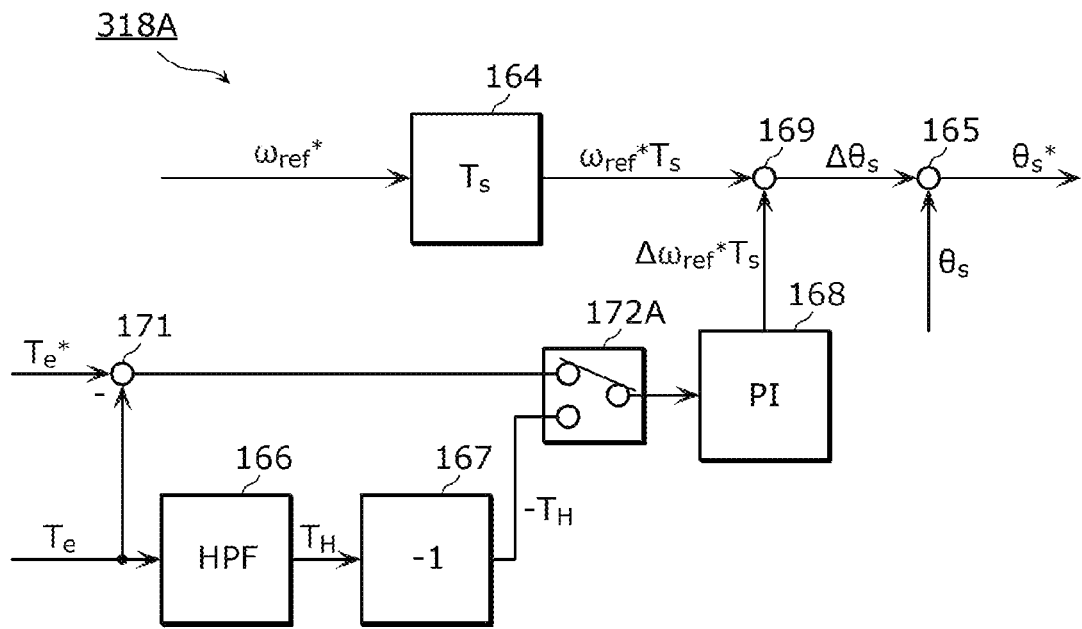
FIG. 17 is a block diagram of a command phase specifier according to Embodiment 3.
Figure 18:
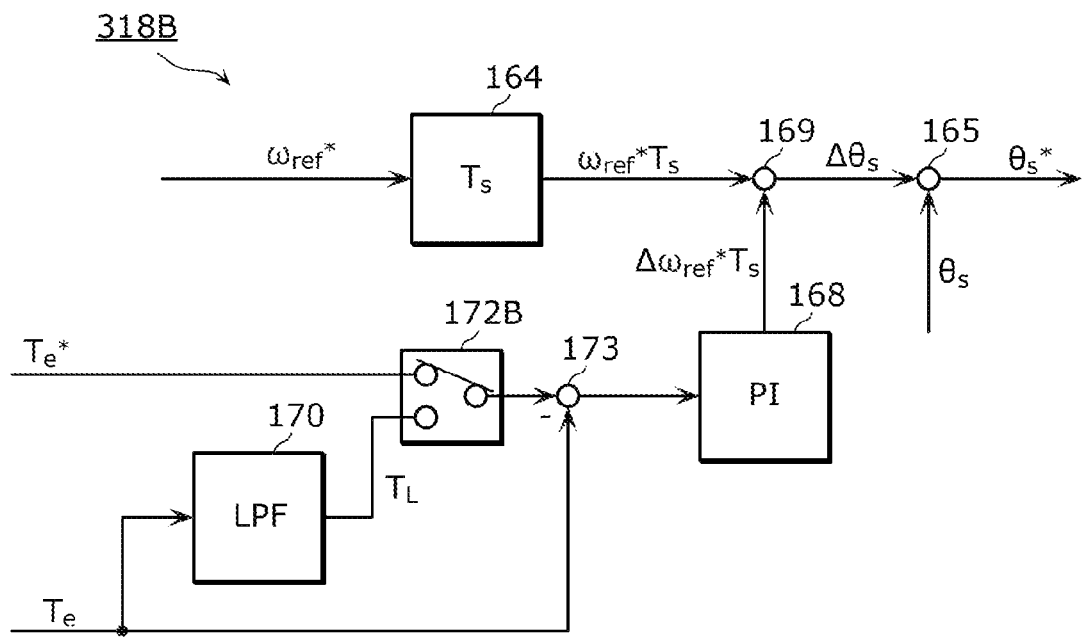
FIG. 18 is a block diagram of a command phase specifier according to Embodiment 3.

Command phase specifier 318 may be, for example, command phase specifier 318A illustrated in FIG. 17, and may be command phase specifier 318B illustrated in FIG. 18.

As illustrated in FIG. 17, command phase specifier 318A is different from command phase specifier 218C according to Embodiment 2 in that subtractor 171 and switcher 172A are added.

Switcher 172A selects any one of an output from subtractor 171 and an output from sign inverter 167, and outputs the selected one to PI compensator 168.

Command phase specifier 318A executes the first function in the case where switcher 172A selects the output from sign inverter 167. Command phase specifier 318A executes the second function in the case where switcher 172A selects the output from subtractor 171.

Switcher 172A selects, in its initial state, the output from sign inverter 167. Then, in the case where switcher 133 controls the switching from the current synchronous operation to the flux synchronous operation, switcher 172A switches from the selection of the output from sign inverter 167 to the selection of the output from subtractor 171.

The period: from when switcher 133 controls the switching from the current synchronous operation to the flux synchronous operation; to when switcher 172A controls the switching from the selection of the output from sign inverter 167 to the selection of the output from subtractor 171 is, typically, 0.5 seconds.

As illustrated in FIG. 18, command phase specifier 318B is different from command phase specifier 218D according to Embodiment 2 in that switcher 172B is added.

Switcher 172B selects any one of an output from low-pass filter 170 and command torque $T_e^*$, and outputs the selected one to subtractor 173.

Command phase specifier 318B executes the first function in the case where switcher 1728 selects the output from low-pass filter 170. Command phase specifier 318B executes the second function in the case where switcher 172B selects command torque $T_e^*$.

Switcher 172B selects, in its initial state, the output from low-pass filter 170. Then, in the case where switcher 133 controls the switching from the current synchronous operation to the flux synchronous operation, switcher 172B switches from the selection of the output from low-pass filter 170 to the selection of command torque $T_e^*$.

The period: from when switcher 133 controls the switching from the current synchronous operation to the flux synchronous operation; to when switcher 172B controls the switching from the selection of the output from low-pass filter 170 to the selection of command torque $T_e^*$ is, typically, 0.5 seconds.

According to the above-described configuration of command phase specifier 318, in the case where switcher 133 controls the switching from the current synchronous operation to the flux synchronous operation, flux synchronous/position sensorless controller 135 controls the switching from the flux synchronous operation as the flux control operation to the position sensorless flux control operation as the flux control operation.

Therefore, at the time of a transition from the current synchronous operation to the position sensorless flux control operation, rotary machine control device 100B inserts the flux synchronous operation.

(Consideration)

As described above, according to rotary machine control device 100B having the above-described configuration, the flux synchronous operation is inserted at the time of the transition from the current synchronous operation to the position sensorless flux control operation.

As a result, at the time of the switching from the current synchronous operation to the position sensorless flux control operation, fluctuations in the amplitude of the command flux and fluctuations in the phase thereof are suppressed from occurring at the same time.

Therefore, according to rotary machine control device 100B having the above-described configuration, the voltage surge that occurs at the time of the switching from the current synchronous operation to the position sensorless flux control operation can be further suppressed.

Embodiment 4

Now, a rotary machine control device according to Embodiment 4 configured by changing part of rotary machine control device 100 according to Embodiment 1 is described. Here, for the rotary machine control device according to Embodiment 4, constituent elements similar to those of rotary machine control device 100 are assumed to have already been described, the same reference signs are given to these constituent elements, detailed description thereof is omitted, and different points from rotary machine control device 100 are mainly described.

Figure 19:
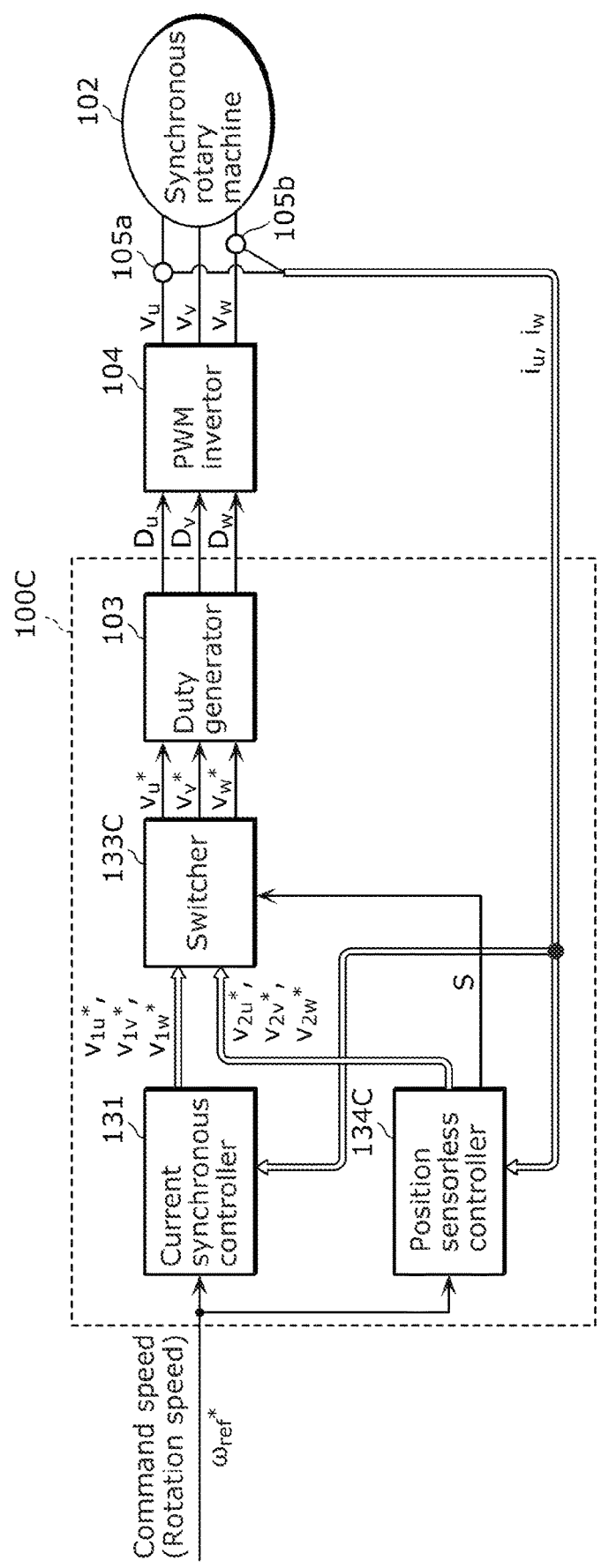
FIG. 19 is a block diagram of a rotary machine control device according to Embodiment 4.

FIG. 19 is a block diagram of rotary machine control device 100C according to Embodiment 4.

As illustrated in FIG. 19, rotary machine control device 100C is different from rotary machine control device 100 according to Embodiment 1 in that: switcher 133 is changed to switcher 133C; and position sensorless controller 134 is changed to position sensorless controller 134C.

Similarly to switcher 133 according to Embodiment 1, switcher 133C selects one of command voltage vectors $v_{1u}^*$, $v_{1v}^*$, and $v_{1w}^*$ and command voltage vectors $v_{2u}^*$, $v_{2v}^*$, and $v_{2w}^*$, and outputs the selected one as command voltage vectors $v_u^*$, $v_v^*$, and $v_w^*$. That is, similarly to switcher 133, switcher 133C controls the switching from the current synchronous operation to the flux control operation (here, the position sensorless flux control operation).

Note that, compared with switcher 133, switcher 133C is additionally provided with a function of switching from the current synchronous operation to the flux control operation at the timing at which switching control signal S (to be described later) output from position sensorless controller 134C is input to switcher 133C. That is, when switching control signal S is output from position sensorless controller 134C, switcher 133C switches from the current synchronous operation to the flux control operation.

Position sensorless controller 134C has a function similar to the function provided to position sensorless controller 134, and outputs, to switcher 133C, switching control signal S that is a signal for causing switcher 133C to switch from the current synchronous operation to the flux control operation.

Figure 20:
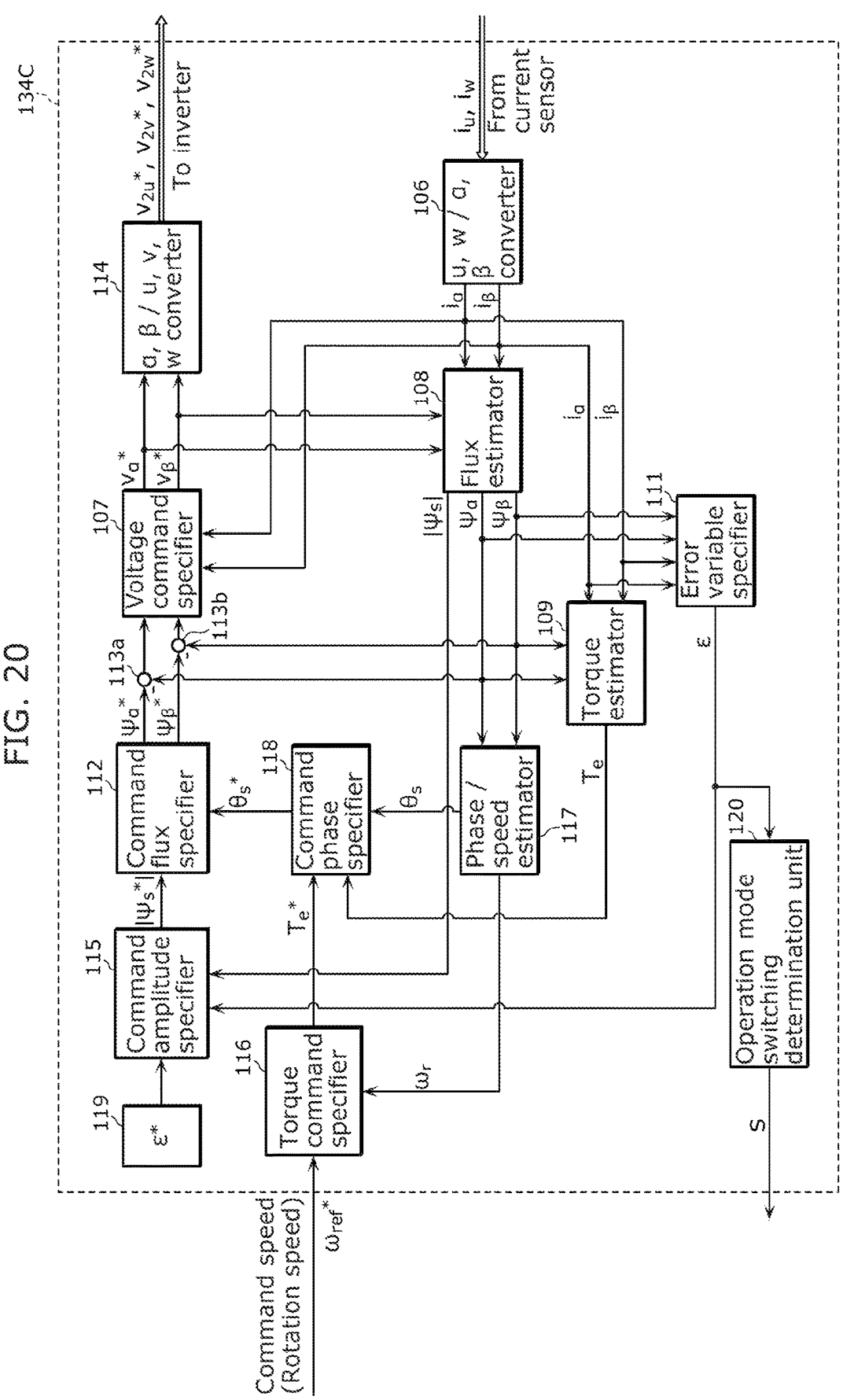
FIG. 20 is a block diagram of a position sensorless controller according to Embodiment 4.

FIG. 20 is a block diagram of position sensorless controller 134C.

As illustrated in FIG. 20, position sensorless controller 134C is different from position sensorless controller 134 according to Embodiment 1 in that operation mode switching determination unit 120 is added.

Operation mode switching determination unit 120 outputs switching control signal S.

Operation mode switching determination unit 120 may output switching control signal S, for example, when an absolute value of error variable ε indicating the reactive power components becomes less than or equal to a predetermined value, error variable ε being obtained by error variable specifier 111 by: calculating the inner product (second inner product) of estimated magnet flux Ψ' of the permanent magnet of synchronous rotary machine 102 and detected current i of synchronous rotary machine 102; or calculating the inner product (first inner product) of estimated flux Ψ of synchronous rotary machine 102 and detected current i of synchronous rotary machine 102.

Figure 21:
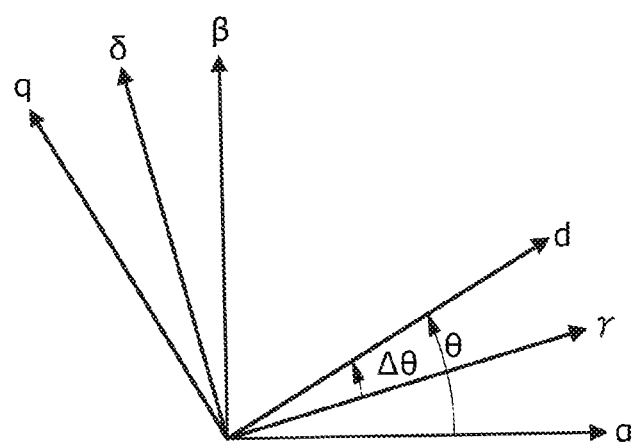
FIG. 21 is a diagram for describing a d-q coordinate system, an α-β coordinate system, and a γ-δ coordinate system.

FIG. 21 is a diagram for describing a d-q coordinate system, an α-β coordinate system, and a γ-δ coordinate system. In FIG. 21, γ-δ coordinates (third two-phase coordinates) are added to the coordinate systems described with reference to FIG. 2, and FIG. 21 illustrates a relation among the three two-phase coordinates.

Figure 22:
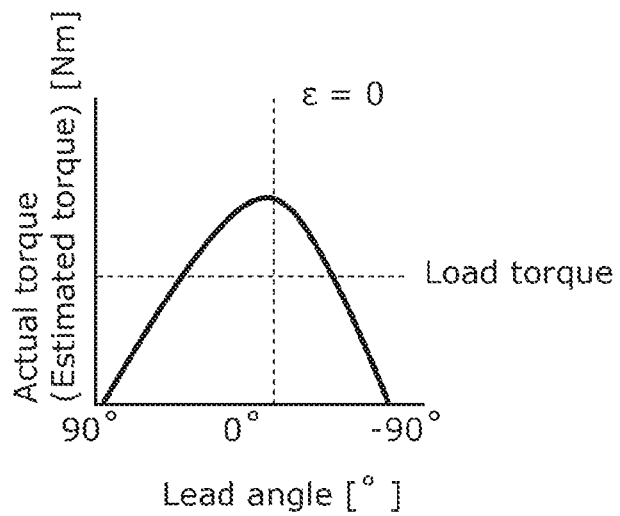
FIG. 22 is a correlation diagram illustrating a relation between a lead angle of the d-axis with respect to the γ-axis and an actual torque of a synchronous rotary machine.

FIG. 22 is a correlation diagram illustrating a relation between: lead angle Δθ of the d-axis on the d-q coordinates (first two-phase coordinates) with respect to the γ-axis on the γ-δ coordinates (third two-phase coordinates); and an actual torque (estimated torque $T_e$) of synchronous rotary machine 102.

As illustrated in FIG. 22, in the case where lead angle Δθ becomes excessively large (excessively deviates in the 90° direction in FIG. 22) and the case where lead angle Δθ becomes excessively small (excessively deviates in the −90° direction in FIG. 22), the actual torque of synchronous rotary machine 102 may fall below a load torque of synchronous rotary machine 102.

If the switching from the current synchronous operation to the flux control operation is made at the timing at which the actual torque of synchronous rotary machine 102 falls below the load torque of synchronous rotary machine 102 as described above, the speed of synchronous rotary machine 102 cannot follow in the flux control operation after the switching, and the loss of synchronism in the flux control operation after the switching may occur.

Therefore, at the timing at which the actual torque of synchronous rotary machine 102 becomes the vicinity of its maximum value, that is, when the absolute value of error variable ε indicating the reactive power components becomes less than or equal to the predetermined value, operation mode switching determination unit 120 outputs switching control signal S. Here, the predetermined value is a value that causes the actual torque of synchronous rotary machine 102 not to fall below the load torque of synchronous rotary machine 102.

The predetermined value may be determined based on a measurement result that is measured in advance using an actual machine, and may be calculated in advance through simulation.

As a result, the loss of synchronism in the flux control operation after the switching can be suppressed.

In particular, operation mode switching determination unit 120 desirably outputs switching control signal S at the timing at which the actual torque of synchronous rotary machine 102 becomes its maximum value, that is, when the absolute value of error variable ε indicating the reactive power components becomes zero.

Figure 23:
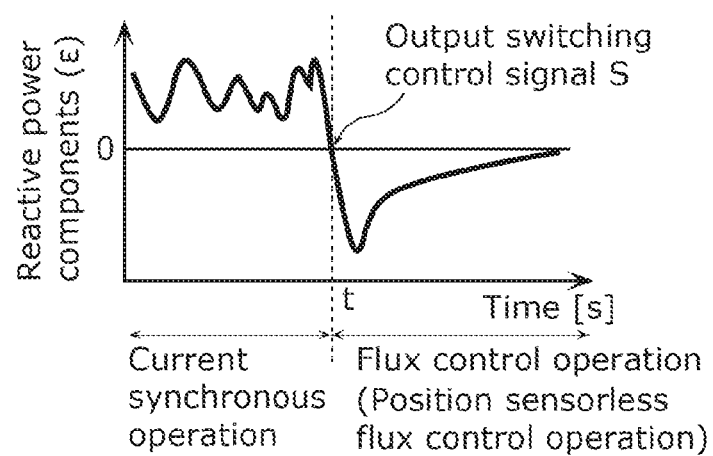
FIG. 23 is an example of a time chart illustrating the timing at which an operation mode switching determination unit according to Embodiment 4 outputs a switching control signal.

FIG. 23 is an example of a time chart illustrating the timing at which operation mode switching determination unit 120 outputs switching control signal S.

As illustrated in FIG. 23, at the timing at which the absolute value of error variable ε indicating the reactive power components becomes less than or equal to the predetermined value (here, zero), operation mode switching determination unit 120 outputs switching control signal S. As a result, at the timing at which the absolute value of error variable ε indicating the reactive power components becomes less than or equal to the predetermined value (here, zero), switcher 133C switches from the current synchronous operation to the flux control operation (here, the position sensorless flux control operation).

Alternatively, at the timing at which the induced voltage of synchronous rotary machine 102 becomes high enough to enable carrying out the flux control operation after the switching with high accuracy, operation mode switching determination unit 120 may output switching control signal S. More specifically, when the first predetermined period determined based on an acceleration rate and a switching rotation speed of synchronous rotary machine 102 that are determined in advance has elapsed from the start of the current synchronous operation, operation mode switching determination unit 120 may output switching control signal S. Here, the first predetermined period is a period in which the induced voltage of synchronous rotary machine 102 becomes high enough to enable carrying out the flux control operation after the switching with high accuracy.

The first predetermined period may be determined based on a measurement result that is measured in advance using an actual machine, and may be calculated in advance through simulation.

Here, as an example to which the present disclosure is not necessarily limited, in the case where the acceleration rate is 12,000 rpm/s and where the switching rotation speed is 1,200 rpm, the first predetermined period determined based on these values may be 0.1 seconds.

As a result, the loss of synchronism in the flux control operation after the switching is suppressed.

Moreover, even when the absolute value of error variable ε indicating the reactive power components becomes less than or equal to the predetermined value, at the timing at which the induced voltage of synchronous rotary machine 102 does not become high enough to enable carrying out the flux control operation after the switching with high accuracy, operation mode switching determination unit 120 may be prohibited from outputting switching control signal S. More specifically, operation mode switching determination unit 120 may prohibit the switching from the current synchronous operation to the flux control operation when the absolute value of the first inner product or the second inner product obtained by error variable specifier 111 becomes less than or equal to the predetermined value in the second predetermined period from the start of the current synchronous operation, the second predetermined period being shorter than the first predetermined period. Here, the second predetermined period is a period in which the induced voltage of synchronous rotary machine 102 does not become high enough to enable carrying out the flux control operation after the switching with high accuracy.

The second predetermined period may be determined based on a measurement result that is measured in advance using an actual machine, and may be calculated in advance through simulation.

Here, as an example to which the present disclosure is not necessarily limited, in the case where the acceleration rate is 12,000 rpm/s, where the switching rotation speed is 1,200 rpm, and where the first predetermined period is 0.1 seconds, the second predetermined period may be 0.08 seconds.

As a result, the loss of synchronism in the flux control operation after the switching is further suppressed.

Figure 24:
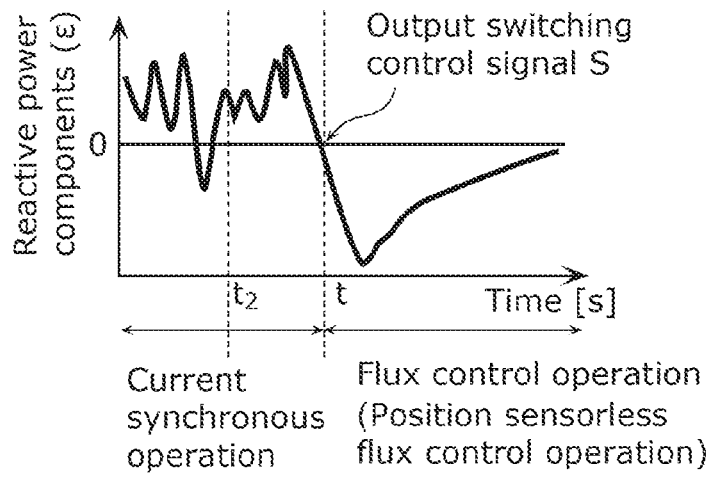
FIG. 24 is an example of a time chart illustrating the timing at which an operation mode switching determination unit according to Embodiment 4 outputs a switching control signal.

FIG. 24 is an example of a time chart illustrating the timing at which operation mode switching determination unit 120 outputs switching control signal S.

As illustrated in FIG. 24, even when the absolute value of error variable ε indicating the reactive power components becomes less than or equal to the predetermined value (here, zero) in the second predetermined period ($t_2$) from the start of the current synchronous operation, operation mode switching determination unit 120 does not output switching control signal S. Meanwhile, when the absolute value of error variable ε indicating the reactive power components becomes less than or equal to the predetermined value (here, zero) after the second predetermined period, operation mode switching determination unit 120 outputs switching control signal S. As a result, when the absolute value of error variable ε indicating the reactive power components becomes less than or equal to the predetermined value (here, zero) in the second predetermined period from the start of the current synchronous operation, switcher 133C prohibits the switching from the current synchronous operation to the flux control operation (here, the position sensorless flux control operation). Then, when the absolute value of error variable ε indicating the reactive power components becomes less than or equal to the predetermined value (here, zero) after the second predetermined period, switcher 133C switches from the current synchronous operation to the flux control operation (here, the position sensorless flux control operation).

Moreover, when the absolute value of error variable ε indicating the reactive power components does not become less than or equal to the predetermined value during the current synchronous operation and the first predetermined period has elapsed, operation mode switching determination unit 120 may output switching control signal S.

Figure 25:
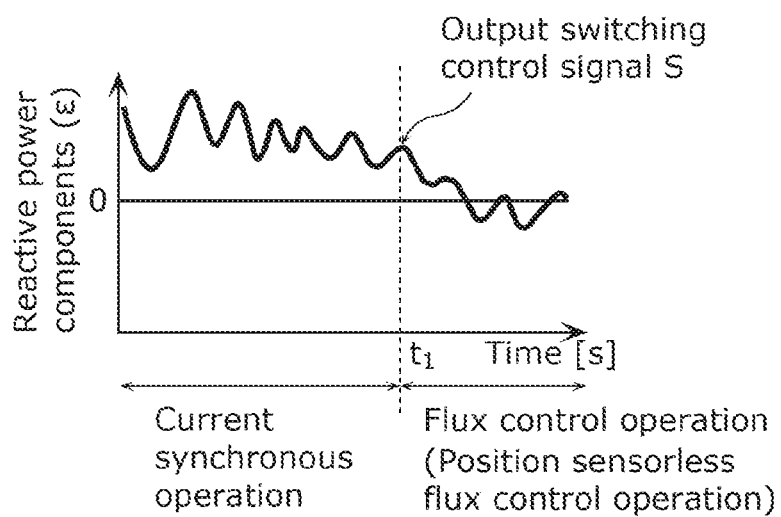
FIG. 25 is an example of a time chart illustrating the timing at which an operation mode switching determination unit according to Embodiment 4 outputs a switching control signal.

FIG. 25 is an example of a time chart illustrating the timing at which operation mode switching determination unit 120 outputs switching control signal S.

As illustrated in FIG. 25, when the absolute value of error variable ε indicating the reactive power components does not become less than or equal to the predetermined value (here, zero) during the current synchronous operation, if the first predetermined period ($t_1$) has elapsed, the first predetermined period ($t_1$) being the timing at which the induced voltage of synchronous rotary machine 102 becomes high enough to enable carrying out the flux control operation after the switching with high accuracy, operation mode switching determination unit 120 outputs switching control signal S. As a result, when the absolute value of error variable ε indicating the reactive power components does not become less than or equal to the predetermined value during the current synchronous operation and the first predetermined period has elapsed, switcher 133C switches from the current synchronous operation to the flux control operation (here, the position sensorless flux control operation).

As a result, the loss of synchronism in the flux control operation after the switching is suppressed.
(Consideration)

As described above, according to rotary machine control device 100C having the above-described configuration, the loss of synchronism after the switching from the current synchronous operation to the flux control operation is suppressed.

Accordingly, according to rotary machine control device 100C having the above-described configuration, the stability in the activation period of the rotary machine control device that performs a flux control operation which mainly uses the flux, such as the direct torque control, can be further improved.

Note that the configuration example in which operation mode switching determination unit 120 and switcher 133C are applied to rotary machine control device 100 according to Embodiment 1 is described in Embodiment 4, operation mode switching determination unit 120 outputting switching control signal S when the absolute value of the first inner product of the estimated flux and the detected current or the second inner product of the magnet flux and the detected current becomes less than or equal to the predetermined value or when the first predetermined period determined based on the acceleration rate and the switching rotation speed of synchronous rotary machine 102 that are determined in advance has elapsed from the start of the current synchronous operation, switcher 133C switching from the current synchronous operation to the flux control operation when switching control signal S is output from operation mode switching determination unit 120.

However, a target to which above-described operation mode switching determination unit 120 and above-described switcher 133C are applied is not limited to rotary machine control device 100. For example, operation mode switching determination unit 120 and switcher 133C may be applied to the rotary machine control device that is described in PTL 2 and has the configuration in which the command amplitude is generated without executing the feedback control using the first inner product of the estimated flux and the detected current or the second inner product of the magnet flux and the detected current.

In this case, in the rotary machine control device described in PTL 2 to which above-described operation mode switching determination unit 120 and above-described switcher 133C are applied, the loss of synchronism after the switching from the current synchronous operation (activation synchronous operation) to the flux control operation (position sensorless operation) is suppressed.

Accordingly, according to the rotary machine control device described in PTL 2 to which above-described operation mode switching determination unit 120 and above-described switcher 133C are applied, the stability in the activation period of the rotary machine control device that performs a flux control operation which mainly uses the flux, such as the direct torque control, can be further improved.
(Supplementary Notes)

While the rotary machine control device according to an aspect of the present disclosure has been described above based Embodiments 1 through 4, the present disclosure is not limited to these embodiments. One or more aspects of the present disclosure may also encompass embodiments achieved by making various modifications to the above embodiments that are conceivable by a person of skill in the art, as well as embodiments resulting from combination of some constituent elements from different embodiments, so long as such embodiments are within the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-076595 filed on Apr. 28, 2021 and Japanese Patent Application No. 2021-159326 filed on Sep. 29, 2021.

INDUSTRIAL APPLICABILITY

The present disclosure is widely applicable to, for example, a rotary machine control device that controls a rotary machine.

The invention claimed is:

1. A rotary machine control device comprising:
a flux estimator that estimates a rotary machine flux that is a flux of a synchronous rotary machine;
a command amplitude specifier that generates a command amplitude that is an amplitude of a command flux, by executing feedback control using a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current;
a command flux specifier that generates the command flux using the command amplitude;
a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current for activating the synchronous rotary machine, the flux control operation being an operation of performing control to cause the estimated flux to be the command flux generated by the command flux specifier;
a torque estimator that calculates an estimated torque using the detected current and the estimated flux; and
a command phase specifier that calculates a torque phase for converging the estimated torque with a command torque,
wherein, when the switcher controls switching to the flux control operation, the flux estimator gives, to the feedback control, an amplitude of the estimated flux estimated before switching to the flux control operation, as an initial value of the command amplitude immediately after switching to the flux control operation,
the command flux specifier generates the command flux using the command amplitude and the torque phase that is calculated by the command phase specifier from the phase of the estimated flux, and
the rotary machine control device carries out, as the flux control operation, a position sensorless flux control operation that is performed based on the command flux.

2. The rotary machine control device according to claim 1,
wherein, when the rotary machine control device transitions from the current synchronous operation to the position sensorless flux control operation:
the command flux specifier (1) specifies an amount of movement that the phase of the estimated flux should move per control cycle, using a command speed given to the synchronous rotary machine, and (2) specifies a command flux vector phase, using the amount of movement specified and the phase of the estimated flux; and
the rotary machine control device inserts, based on the command flux vector phase, a flux synchronous operation that is carried out as the flux control operation.

3. The rotary machine control device according to claim 1,
wherein the command amplitude specifier sets a value greater than or equal to zero as a target value for a calculation result of the first inner product or the second inner product.

4. The rotary machine control device according to claim 1, further comprising:
an error variable specifier that calculates the first inner product or the second inner product,
wherein the switcher switches from the current synchronous operation to the flux control operation when an absolute value of the first inner product or the second inner product calculated by the error variable specifier becomes less than or equal to a predetermined value during the current synchronous operation or when a first predetermined period has elapsed from a start of the current synchronous operation, the first predetermined period being determined based on an acceleration rate and a switching rotation speed of the synchronous rotary machine that are determined in advance.

5. The rotary machine control device according to claim 4,
wherein the predetermined value is zero.

6. The rotary machine control device according to claim 4,
wherein the switcher prohibits switching from the current synchronous operation to the flux control operation when the absolute value of the first inner product or the second inner product calculated by the error variable specifier becomes less than or equal to the predetermined value in a second predetermined period from the start of the current synchronous operation, the second predetermined period being shorter than the first predetermined period.

7. The rotary machine control device according to claim 4,
wherein the switcher switches from the current synchronous operation to the flux control operation when the absolute value of the first inner product or the second inner product calculated by the error variable specifier does not become less than or equal to the predetermined value during the current synchronous operation and the first predetermined period has elapsed.

8. A rotary machine control device comprising:
a flux estimator that estimates a rotary machine flux that is a flux of a synchronous rotary machine;
an error variable specifier that calculates a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current; and
a command flux specifier that generates a command flux using a command amplitude that is an amplitude of the command flux and is generated by executing feedback control using the first inner product or the second inner product;
a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current for activating the synchronous rotary machine, the flux control operation being an operation of performing control to cause the estimated flux to be the command flux;

a torque estimator that calculates an estimated torque using the detected current and the estimated flux; and a command phase specifier that calculates a torque phase for converging the estimated torque with a command torque, wherein the switcher switches from the current synchronous operation to the flux control operation when an absolute value of the first inner product or the second inner product calculated by the error variable specifier becomes less than or equal to a predetermined value during the current synchronous operation or when a first predetermined period has elapsed from a start of the current synchronous operation, the first predetermined period being determined based on an acceleration rate and a switching rotation speed of the synchronous rotary machine that are determined in advance, the command flux specifier generates the command flux using the command amplitude and the torque phase that is calculated by the command phase specifier from the phase of the estimated flux, and the rotary machine control device carries out, as the flux control operation, a position sensorless flux control operation that is performed based on the command flux.

9. The rotary machine control device according to claim 8, wherein the predetermined value is zero.

10. The rotary machine control device according to claim 8, wherein the switcher prohibits switching from the current synchronous operation to the flux control operation when the absolute value of the first inner product or the second inner product calculated by the error variable specifier becomes less than or equal to the predetermined value in a second predetermined period from the start of the current synchronous operation, the second predetermined period being shorter than the first predetermined period.

11. The rotary machine control device according to claim 8, wherein the switcher switches from the current synchronous operation to the flux control operation when the absolute value of the first inner product or the second inner product calculated by the error variable specifier does not become less than or equal to the predetermined value during the current synchronous operation and the first predetermined period has elapsed.

12. The rotary machine control device according to claim 8, wherein the first predetermined period is determined by dividing the switching rotation speed by the acceleration rate.

13. A rotary machine control device comprising:

a flux estimator that estimates a rotary machine flux that is a flux of a synchronous rotary machine;

a command amplitude specifier that generates a command amplitude that is an amplitude of a command flux, by executing feedback control using a first inner product or a second inner product, the first inner product being a product of an estimated flux that is the rotary machine flux estimated and a detected current of the synchronous rotary machine, the second inner product being a product of an estimated magnet flux of a permanent magnet of the synchronous rotary machine and the detected current;

a command flux specifier that generates the command flux using the command amplitude;

a switcher that controls switching from a current synchronous operation to a flux control operation, the current synchronous operation being an operation of supplying, regardless of a phase of the estimated flux, the synchronous rotary machine with a predetermined current for the current synchronous operation, the predetermined current for the current synchronous operation being a current necessary for activating the synchronous rotary machine, the flux control operation being an operation of performing control to cause the estimated flux to be the command flux generated by the command flux specifier; and an error variable specifier that calculates the first inner product or the second inner product, wherein, when the switcher controls switching to the flux control operation, the flux estimator gives, to the feedback control, an amplitude of the estimated flux estimated before switching to the flux control operation, as an initial value of the command amplitude immediately after switching to the flux control operation, and the switcher switches from the current synchronous operation to the flux control operation when an absolute value of the first inner product or the second inner product calculated by the error variable specifier becomes less than or equal to a predetermined value during the current synchronous operation or when a first predetermined period has elapsed from a start of the current synchronous operation, the first predetermined period being determined based on an acceleration rate and a switching rotation speed of the synchronous rotary machine that are determined in advance.

14. The rotary machine control device according to claim 13, wherein the command flux specifier (1) specifies an amount of movement that the phase of the estimated flux should move per control cycle, using a command speed given to the synchronous rotary machine, and (2) specifies a command flux vector phase, using the amount of movement specified and the phase of the estimated flux, and the rotary machine control device carries out a flux synchronous operation based on the command flux vector phase as the flux control operation.

15. The rotary machine control device according to claim 13, wherein the command amplitude specifier sets a value greater than or equal to zero as a target value for a calculation result of the first inner product or the second inner product.

16. The rotary machine control device according to claim 13, wherein the predetermined value is zero.

17. The rotary machine control device according to claim 13, wherein the switcher prohibits switching from the current synchronous operation to the flux control operation when the absolute value of the first inner product or the second inner product calculated by the error variable specifier becomes less than or equal to the predetermined value in a second predetermined period from the start of the current synchronous operation, the second predetermined period being shorter than the first predetermined period.

18. The rotary machine control device according to claim 13,
wherein the switcher switches from the current synchronous operation to the flux control operation when the absolute value of the first inner product or the second inner product calculated by the error variable specifier does not become less than or equal to the predetermined value during the current synchronous operation and the first predetermined period has elapsed.

* * * * *